United States Patent
Luitel

(10) Patent No.: US 9,758,723 B2
(45) Date of Patent: Sep. 12, 2017

(54) UP-CONVERSION PHOSPHOR

(71) Applicant: GBRY CO., LTD., Osaka (JP)

(72) Inventor: Hom Nath Luitel, Osaka (JP)

(73) Assignee: GBRY CO., LTD, Osaka (JP)

(*) Notice: Subject to any disclaimer, the term of this patent is extended or adjusted under 35 U.S.C. 154(b) by 180 days.

(21) Appl. No.: 14/921,081

(22) Filed: Oct. 23, 2015

(65) Prior Publication Data

US 2016/0040064 A1    Feb. 11, 2016

Related U.S. Application Data

(63) Continuation of application No. PCT/JP2015/054260, filed on Feb. 17, 2015.

(30) Foreign Application Priority Data

Feb. 24, 2014 (JP) ................. 2014-033011

(51) Int. Cl.
  *C09K 11/77* (2006.01)
(52) U.S. Cl.
  CPC ................. *C09K 11/7776* (2013.01)
(58) Field of Classification Search
  None
  See application file for complete search history.

(56) References Cited

FOREIGN PATENT DOCUMENTS

| CN | 101928562 | * 12/2010 |
| JP | 2004-292599 | 10/2004 |
| JP | 2007-46002 | 2/2007 |
| JP | 2013-14651 | 1/2013 |
| JP | 2013-60568 | 4/2013 |
| JP | 2014-234479 | 12/2014 |

OTHER PUBLICATIONS

International Search Report issued in International Application No. PCT/JP2015/054260 on May 26, 2015.
H. Wang et al., The Journal of Physical Chemistry C, "Visible Upconversion Luminescence from $Y_2O_3:EU^{3+}$, $Yb^{3+}$", 2008, 112 (42), p. 16651-16654.
B.S. Cao et al., Journal of Luminescence, "Upconversion properties of $Er^{3+}$—$Yb^{3+}$:$NaYF_4$ phosphors with a wide range of $Yb^{3+}$ concentration", 2013, 135 (3), pp. 128-132.

(Continued)

*Primary Examiner* — Carol M Koslow
(74) *Attorney, Agent, or Firm* — Wenderoth, Lind & Ponack, L.L.P.

(57) ABSTRACT

To provide a novel up-conversion phosphor excellent in light-emitting properties, the up-conversion phosphor of the present invention is an up-conversion phosphor including, in a $ZnMoO_4$-based matrix material thereof, $Yb^{3+}$, at least one rare earth metal ion selected from the group consisting of $Tm^{3+}$, $Er^{3+}$ and $Ho^{3+}$, and at least one monovalent metal ion selected from the group consisting of $Li^+$, $K^+$, $Na^+$ and $Rb^+$.

6 Claims, 13 Drawing Sheets

(56) References Cited

OTHER PUBLICATIONS

J. Sokolnicki, et al., Materials Chemistry and Physics, "Upconversion luminescence from $Er^{3+}$ in nanocrystalline $Y_2Si_2O_7$:$Er^{3+}$ and $Y_2Si_2O_7$:$Yb_{3+}$,$ER^{3+}$ phosphors", 2011, 131 (1-2), pp. 306-312.

Xiuhong Pan et al., Journal of Luminescence, "Infrared to visible upconversion luminescence in $Er^{3+}$/$Yb^{3+}$ doped titanate glass prepared by containerless processing", 2012, 132, pp. 1025-1029.

F. Vetrone et al., Chemistry of Materials, "Near-Infrared-to-Blue Upconversion in Colloidal BaYF5:TM3+, Yb3+ Nanocrystals", 2009, 21 (9), pp. 1847-1851.

* cited by examiner

UP-CONVERSION PHOSPHOR

TECHNICAL FIELD

The present invention relates to an up-conversion phosphor capable of emitting light higher in energy than excitation light.

BACKGROUND ART

An up-conversion phosphor is a material capable of radiating light higher in energy than excitation light.

An up-conversion phosphor can use a low energy light source, and hence is expected to cope with applications in various fields; however, because a phosphor usually radiates light lower in energy than the excitation light (down-conversion), in order to give rise to up-conversion phenomenon, it is necessary to involve, for example, excited-state absorption, multi-photon absorption and energy transfer.

Accordingly, various materials have been investigated, and at the same time, various investigations and proposals have been performed for the purpose of enhancing light emission efficiency.

For example, some relevant reports are listed below: a report on phosphor microparticles represented by the compositional formula, $(R_{1-x}, Er_x)_2O_3$ (R is at least one of Y, La, Gd and Lu, and x is given in terms of molar quantity and satisfies the relation, $0.001 \leq x \leq 0.20$), and is caused to exhibit up-conversion light emission by the light having a wavelength falling within a range from 500 nm to 2000 nm (see Patent Literature 1); a report on a visible up-conversion light emission from $Y_2O_3:Eu^{3+},Yb^{3+}$ (see Non Patent Literature 1); a report on the up-conversion properties of $Er^{3+}$—$Yb^{3+}$: $NaYF_4$ including $Yb^{3+}$ having a wide concentration range (see Non Patent Literature 2); a report on the up-conversion fluorescence from $Er^{3+}$ in nanocrystals $Y_2Si_2O_7:Er^{3+}$ and $Y_2Si_2O_7:Yb^{3+},Er^{3+}$ (see Non Patent Literature 3); a report on the up-conversion fluorescence from infrared to visible light in an $Er^{3+}/Yb^{3+}$ added titanate glass prepared by a method using no vessel (see Non Patent Literature 4); a report on the technique to produce up-conversion nanoparticles by irradiating a target (made of a fluorescent material having up-conversion properties) in a liquid with a laser light (see Patent Literature 2); and a report on blue up-conversion from near infrared, in colloidal $BaYF_5:Tm^{3+}, Yb^{3+}$ nanocrystals (see Non Patent Literature 5).

CITATION LIST

Patent Literature

Patent Literature 1: Japanese Patent Laid-Open No. 2004-292599
Patent Literature 2: Japanese Patent Laid-Open No. 2013-14651

Non Patent Literature

Non Patent Literature 1: H. Wang et. al., J. Phys. Chem. C, 2008, 112 (42), pp. 16651-16654.
Non Patent Literature 2: B. S. Cao et. al., J. Luminescence, 2013, 135 (3), pp. 128-132.
Non Patent Literature 3: J. Sokolnicki, Materials Chemistry and Physics, 2011, 131 (1-2), pp. 306-312.
Non Patent Literature 4: X. Pan et. al., J. Luminescence, 2012, 132, pp. 1025-1029.
Non Patent Literature 5: F. Vetrone et. al., Chem. Mater., 2009, 21 (9), pp. 1847-1851.

SUMMARY OF INVENTION

Technical Problem

However, some conventional up-conversion phosphors are still insufficient in light-emitting properties, and some other conventional up-conversion phosphors use unfavorable materials such as fluorides, and accordingly, existing techniques are required to be improved or novel compositions are required to be developed.

Accordingly, an object of the present invention is to provide a novel up-conversion phosphor capable of developing various light-emitting colors, and additionally, excellent in the light-emitting properties thereof.

Solution to Problem

The present inventors made a continuous diligent study in order to solve the above-descried problem to be solved, and consequently have perfected the present invention by discovering that in the case where the matrix material is a $ZnMoO_4$-based material, when the matrix material is allowed to contain $Yb^{3+}$, at least one rare earth metal ion selected from the group consisting of $Tm^{3+}$, $Er^{3+}$ and $Ho^{3+}$, and at least one monovalent metal ion selected from the group consisting of $Li^+$, $K^+$, $Na^+$ and $Rb^+$, light emissions having various light-emitting colors such as a blue-based color (in the case of $Tm^{3+}$), a green-based color (in the case of $Er^{3+}$), a red-based color (in the case of $Ho^{3+}$), and a white-based color (in the case of combinational use of $Tm^{3+}$ and $Ho^{3+}$) are obtained with high light emission intensities.

In other words, the up-conversion phosphor according to the present invention includes, in the $ZnMoO_4$-based matrix material thereof, $Yb^{3+}$, at least one rare earth metal ion selected from the group consisting of $Tm^{3+}$, $Er^{3+}$ and $Ho^{3+}$, and at least one monovalent metal ion selected from the group consisting of $Li^+$, $K^+$, $Na^+$ and $Rb^+$.

Advantageous Effects of Invention

The up-conversion phosphor of the present invention allows, while the same matrix material being used, up-conversion light emissions having various colors such as a blue-based color, a green-based color, a red-based color and a white-based color to be obtained by appropriately altering the types of the rare earth metals, and the light emission intensities thereof are high.

DESCRIPTION OF EMBODIMENTS

Figure 1:
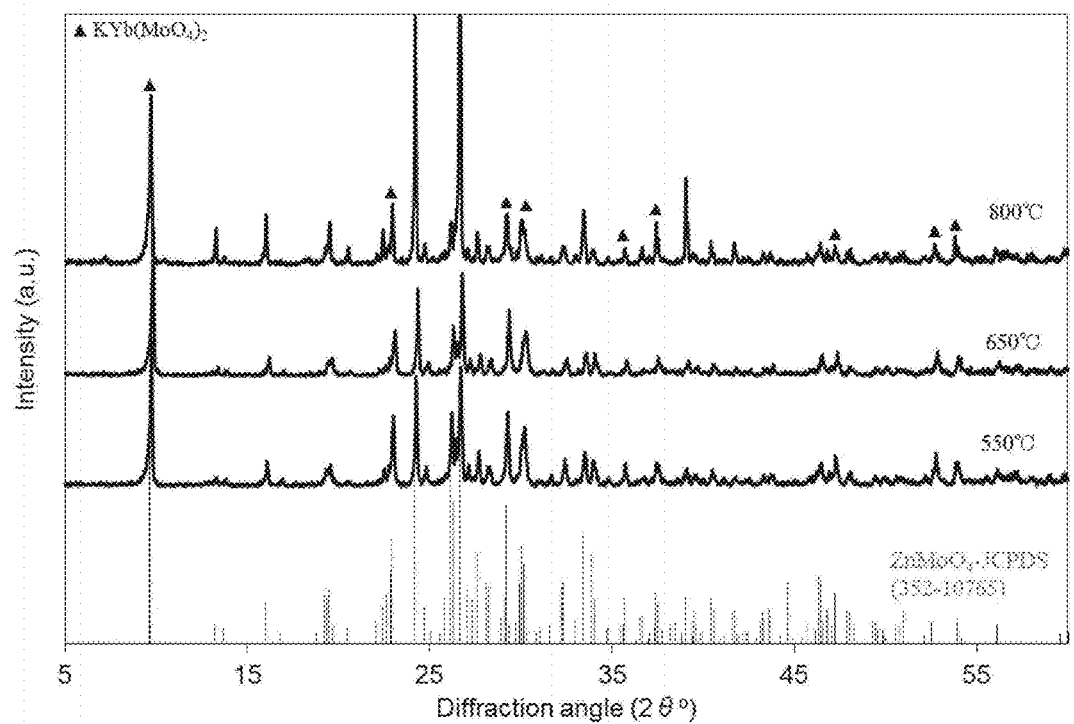
FIG. 1 is a chart showing the XDR spectra of the samples of Examples 1, 75 and 79.

Hereinafter, the up-conversion phosphor according to the present invention is described in detail, but the scope of the present invention is not restricted by these descriptions and the cases other than the cases shown below as examples can also be embodied by appropriately modifying within a scope not impairing the gist of the present invention.

[Up-Conversion Phosphor]

The matrix material of the up-conversion phosphor of the present invention is a $ZnMoO_4$-based matrix material.

Here, in the present invention, the "$ZnMoO_4$-based matrix material" includes matrix materials in which in addition to $ZnMoO_4$, within a limit not essentially altering the properties of the matrix material, a fraction of Zn in $ZnMoO_4$ is substituted with another equivalent element such as Ca.

Specifically, for example, the ratio between Zn and the other equivalent element preferably falls, in terms of the number to atoms, within a range of Zn:other equivalent element=100:0 to 80:20.

The up-conversion phosphor of the present invention is constituted by including the following specific ions in this matrix material.

In the up-conversion phosphor of the present invention, the following specific ions are all inferred to substitute for $Zn^{2+}$ in the matrix material.

[$Yb^{3+}$]

$Yb^{3+}$ is included in the up-conversion phosphor of the present invention.

When the total content of the divalent metal ion in the matrix material, $Yb^{3+}$, the rare earth metal ion and the monovalent metal ion is set at 100 at %, the content ratio of $Yb^{3+}$ (hereinafter, sometimes simply referred to as "the content ratio of $Yb^{3+}$") is preferably 20 at % or less and more preferably 5 to 15 at %.

Here, "the divalent metal ion in the matrix material" in the foregoing description means $Zn^{2+}$ when the matrix material is $ZnMoO_4$, and means $Zn^{2+}$ and the equivalent ion (such as $Ca^{2+}$) when the matrix material is the material in which a fraction of Zn in $ZnMoO_4$ is substituted with another equivalent element (such as Ca). With respect to the content ratio of the below-described rare earth metal ion and the content ratio of the below-described monovalent metal ion, "the divalent metal ion in the matrix material" has the same meaning.

As described above, the content ratio of $Yb^{3+}$ is described to be preferably 20 at % or less; however, because $Yb^{3+}$ is an essential component, needless to say, the case where the content ratio of $Yb^{3+}$ is 0 at % is not involved. The same description is applicable to the descriptions on other essential components.

[Rare Earth Metal Ion]

The up-conversion phosphor of the present invention includes at least one rare earth metal ion selected from the group consisting of $Tm^{3+}$, $Er^{3+}$ and $Ho^{3+}$.

When the rare earth metal ion is $Tm^{3+}$, the up-conversion phosphor exhibits blue-based light emission.

When the total content of the divalent metal ion in the matrix material, $Yb^{3+}$, the rare earth metal ion and the monovalent metal ion is set at 100 at %, the content ratio of $Tm^{3+}$ (hereinafter, sometimes simply referred to as "the content ratio of $Tm^{3+}$") is preferably 2 at % or less, more preferably within a range from 0.05 to 1 at % and particularly preferably within a range from 0.05 to 0.5 at %.

When the rare earth metal ion is $Er^{3+}$, the up-conversion phosphor exhibits green-based light emission.

When the total content of the divalent metal ion in the matrix material, $Yb^{3+}$, the rare earth metal ion and the monovalent metal ion is set at 100 at %, the content ratio of $Er^{3+}$ (hereinafter, sometimes simply referred to as "the content ratio of $Er^{3+}$") is preferably 5 at % or less, more preferably within a range from 0.1 to 2 at % and particularly preferably within a range from 0.2 to 0.6 at %.

When the rare earth metal ion is $Ho^{3+}$, the up-conversion phosphor exhibits red-based light emission.

When the total content of the divalent metal ion in the matrix material, $Yb^{3+}$, the rare earth metal ion and the monovalent metal ion is set at 100 at %, the content ratio of $Ho^{3+}$ (hereinafter, sometimes simply referred to as "the content ratio of $Ho^{3+}$") is preferably 5 at % or less, more preferably 2 at % or less and particularly preferably within a range from 0.03 to 1 at %.

The matrix material can include a plurality of the rare earth metal ions in combination.

Such a combination of a plurality of the rare earth metal ions enables to obtain up-conversion light emission having a color not to be obtained by applying $Tm^{3+}$, $Er^{3+}$ or $Ho^{3+}$ each alone.

In such a case, an intended light-emitting color can be obtained by appropriately selecting the mutual ratio in the combination of the plurality of the rare earth metal ions.

When white-based light emission is obtained, it is advantageous to combine $Tm^{3+}$ and $Ho^{3+}$ as the rare earth metal ions.

[Monovalent Metal Ion]

The up-conversion phosphor of the present invention includes at least one monovalent metal ion selected from the group consisting of $Li^+$, $K^+$, $Na^+$ and $Rb^+$.

In particular, the use of $K^+$ or $Na^+$ results in excellent light-emitting properties, and the use of $K^+$ is particularly preferable.

When the total content of the divalent metal ion in the matrix material, $Yb^{3+}$, the rare earth metal ion and the monovalent metal ion is set at 100 at %, the content ratio of the monovalent metal ion (hereinafter, sometimes simply referred to as, for example, "the content ratio of the monovalent metal ion", "the content ratio of $Li^+$" or the like) is preferably 20 at % or less and more preferably within a range from 5 to 15 at %.

[Method for Producing Up-Conversion Phosphor]

The up-conversion phosphor of the present invention can be produced by using a mixture of the compounds containing the above-described components and by applying, for example, a heretofore known solid phase method or liquid phase method (such as a sol-gel method).

For example, the up-conversion phosphor of the present invention is preferably produced as follows, without being particularly limited.

First, the compounds (for example, oxides and carbonates) containing the elements constituting the up-conversion phosphor is mixed.

The mixture may include a flux.

Examples of the flux include: $Li_2CO_3$, $H_3BO_3$, $NH_4F$, $CaF_2$, $MgF_2$, $B_2O_3$ and $(NH_4)_2CO_3$; among these, $Li_2CO_3$, $H_3BO_3$ and $NH_4F$ are preferable.

The mixing method may be either dry mixing or wet mixing, without being particularly limited; a wet mixing performed by adding ethanol, water or the like is preferably quoted. It is to be noted that in the case of wet mixing, drying is appropriately performed after mixing.

The mixing proportions of the components can be appropriately determined in consideration of the content ratios of the components in the up-conversion phosphor.

When a flux is added, the mixing proportion of the flux is preferably within a range from 0.005 to 0.4 mol.

Next, the mixture obtained as described above is burned.

The burning is performed in an air atmosphere, preferably in a temperature range from 500 to 800° C. and more preferably in a temperature range from 550 to 700° C.

The burning time is preferably 3 to 5 hours.

After burning, the burned mixture may be pulverized into powder, and is preferably pulverized into powder of the order of a few nanometers to several tens nanometers.

EXAMPLES

Hereinafter, the up-conversion phosphor according to the present invention is described in detail with reference to Examples, but the present invention is not limited to these Examples.

Example 1

Powders of $ZnCO_3$; 0.433 g, $MoO_3$; 0.9596 g, $TmCl_3 \cdot 6H_2O$; 0.0026 g, $Yb_2O_3$; 0.134 g, and $K_2CO_3$; 0.046 g were used, and were wet mixed in a mortar with a pestle by using ethanol.

After the mixing, the resulting mixture was dried at 130° C. for 4 hours, and pulverized with a pestle to yield a mixed powder.

Next, the resulting mixed powder was molded with a twin screw extruder into a pellet (Φ13×3 mm), and the pellet was burned in an air atmosphere at 650° C. for 4 hours (heating rate: 5° C./min).

The pellet after burning was finely pulverized with a vibration mill.

Thus, as the sample according to Example 1, there was obtained a powder represented by $ZnMoO_4:Yb^{3+},Tm^{3+},K^+$, and having content ratios of 10 at %, 0.1 at % and 10 at % for $Yb^{3+}$, $Tm^{3+}$ and $K^+$, respectively.

Examples 2 to 7

As each of the samples according to Examples 2 to 7, a powder represented by $ZnMoO_4:Yb^{3+},Tm^{3+},K^+$ and having the content ratios of $Yb^{3+}$, $Tm^{3+}$ and $K^+$ as shown in Table 1 presented below was obtained in the same manner as in Example 1 except that the powder used as the raw material was altered as shown in Table 1 presented below.

TABLE 1

|  |  | Example 2 | Example 3 | Example 4 | Example 5 | Example 6 | Example 7 |
|---|---|---|---|---|---|---|---|
| Amounts used of raw material powders (g) | ZnO | 0.4337 | 0.4328 | 0.432 | 0.43 | 0.431 | 0.428 |
|  | $MoO_3$ | 0.9596 | 0.9596 | 0.9596 | 0.9596 | 0.9596 | 0.9596 |
|  | $Yb_2O_3$ | 0.131 | 0.131 | 0.131 | 0.131 | 0.131 | 0.131 |
|  | $TmCl_3 \cdot 6H_2O$ | 0.0013 | 0.0054 | 0.008 | 0.0107 | 0.0134 | 0.0267 |
|  | $K_2CO_3$ | 0.046 | 0.046 | 0.046 | 0.046 | 0.046 | 0.046 |
| Content ratios of ions (at %) | $Yb^{3+}$ | 10 | 10 | 10 | 10 | 10 | 10 |
|  | $Tm^{3+}$ | 0.05 | 0.2 | 0.3 | 0.4 | 0.5 | 1 |
|  | $K^+$ | 10 | 10 | 10 | 10 | 10 | 10 |

Examples 8 to 12 and Comparative Example 1

As each of the samples according to Examples 8 to 12, a powder represented by $ZnMoO_4:Yb^{3+},Tm^{3+},K^+$ and having the content ratios of $Yb^{3+}$, $Tm^{3+}$ and $K^+$ as shown in Table 2 presented below was obtained in the same manner as in Example 1 except that the powder used as the raw material was altered as shown in Table 2 presented below.

Similarly, as the sample according to Comparative Example 1, a powder represented by $ZnMoO_4:Tm^{3+},K^+$ and having the content ratios of $Tm^{3+}$ and $K^+$ as shown in Table 2 presented below was obtained.

TABLE 2

|  |  | Example 8 | Example 9 | Example 10 | Example 11 | Example 12 | Comparative Example 1 |
|---|---|---|---|---|---|---|---|
| Amounts used of raw material powders (g) | $ZnCO_3$ | 0.46 | 0.44 | 0.412 | 0.406 | 0.379 | 0.487 |
|  | $MoO_3$ | 0.9596 | 0.9596 | 0.9596 | 0.9596 | 0.9596 | 0.9596 |
|  | $Yb_2O_3$ | 0.066 | 0.099 | 0.165 | 0.197 | 0.263 | — |
|  | $TmCl_3 \cdot 6H_2O$ | 0.0026 | 0.0026 | 0.0026 | 0.0026 | 0.0026 | 0.0026 |
|  | $K_2CO_3$ | 0.046 | 0.046 | 0.046 | 0.046 | 0.046 | 0.046 |
| Content ratios of ions (at %) | $Yb^{3+}$ | 5 | 7.5 | 12.5 | 15 | 20 | — |
|  | $Tm^{3+}$ | 0.1 | 0.1 | 0.1 | 0.1 | 0.1 | 0.1 |
|  | $K^+$ | 10 | 10 | 10 | 10 | 10 | 10 |

Examples 13 to 15 and Comparative Example 2

As each of the samples according to Examples 13 to 15, a powder represented by $ZnMoO_4:Yb^{3+},Tm^{3+},M^+$ and having the content ratios of $Yb^{3+}$, $Tm^{3+}$ and $M^+$ as shown in Table 3 presented below was obtained in the same manner as in Example 1 except that the powder used as the raw material was altered as shown in Table 3 presented below. It is to be noted that $M^+$ represents any of $K^+$, $Na^+$, $Li^+$ and $Rb^+$.

Similarly, as the sample according to Comparative Example 2, a powder represented by $ZnMoO_4:Yb^{3+},Tm^{3+}$ and having the content ratios of $Yb^{3+}$ and $Tm^{3+}$ as shown in Table 3 presented below was obtained.

Examples 21 to 26 and Comparative Example 3

As each of the samples according to Examples 21 to 26, a powder represented by $ZnMoO_4:Yb^{3+},Er^{3+},K^+$ and having the content ratios of $Yb^{3+}$, $Er^{3+}$ and $K^+$ as shown in Table 5 presented below was obtained in the same manner as in Example 1 except that the powder used as the raw material was altered as shown in Table 5 presented below.

Similarly, as the sample according to Comparative Example 3, a powder represented by $ZnMoO_4:Yb^{3+},K^+$ and having the content ratios of $Yb^{3+}$ and $K^+$ as shown in Table 5 presented below was obtained.

TABLE 3

|  |  | Example 13 | Example 14 | Example 15 | Comparative Example 2 |
|---|---|---|---|---|---|
| Amounts used of raw material powders (g) | $ZnCO_3$ | 0.433 | 0.433 | 0.433 | 0.487 |
|  | $MoO_3$ | 0.9596 | 0.9596 | 0.9596 | 0.9596 |
|  | $Yb_2O_3$ | 0.134 | 0.134 | 0.134 | 0.134 |
|  | $TmCl_3 \cdot 6H_2O$ | 0.0026 | 0.0026 | 0.0026 | 0.0026 |
|  | $K_2CO_3$ | — | — | — | — |
|  | $Na_2CO_3$ | 0.0354 | — | — | — |
|  | $Li_2CO_3$ | — | 0.025 | — | — |
|  | $Rb_2CO_3$ | — | — | 0.077 | — |
| Content ratios of ions (at %) | $Yb^{3+}$ | 10 | 10 | 10 | 10 |
|  | $Tm^{3+}$ | 0.1 | 0.1 | 0.1 | 0.1 |
|  | $K^+$ | — | — | — | — |
|  | $Na^+$ | 10 | — | — | — |
|  | $Li^+$ | — | 10 | — | — |
|  | $Rb^+$ | — | — | 10 | — |

Examples 16 to 20

As each of the samples according to Examples 16 to 20, a powder represented by $ZnMoO_4:Yb^{3+},Tm^{3+},K^+$ and having the content ratios of $Yb^{3+}$, $Tm^{3+}$ and $K^+$ as shown in Table 4 presented below was obtained in the same manner as in Example 1 except that the powder used as the raw material was altered as shown in Table 4 presented below.

TABLE 4

|  |  | Example 16 | Example 17 | Example 18 | Example 19 | Example 20 |
|---|---|---|---|---|---|---|
| Amounts used of raw material powders (g) | $ZnCO_3$ | 0.46 | 0.44 | 0.412 | 0.406 | 0.379 |
|  | $MoO_3$ | 0.9596 | 0.9596 | 0.9596 | 0.9596 | 0.9596 |
|  | $Yb_2O_3$ | 0.134 | 0.134 | 0.134 | 0.134 | 0.134 |
|  | $TmCl_3 \cdot 6H_2O$ | 0.0026 | 0.0026 | 0.0026 | 0.0026 | 0.0026 |
|  | $K_2CO_3$ | 0.023 | 0.035 | 0.058 | 0.069 | 0.092 |
| Content ratios of ions (at %) | $Yb^{3+}$ | 10 | 10 | 10 | 10 | 10 |
|  | $Tm^{3+}$ | 0.1 | 0.1 | 0.1 | 0.1 | 0.1 |
|  | $K^+$ | 5 | 7.5 | 12.5 | 15 | 20 |

TABLE 5

|  |  | Example 21 | Example 22 | Example 23 | Example 24 | Example 25 | Example 26 | Comparative Example 3 |
|---|---|---|---|---|---|---|---|---|
| Amounts used of raw material powders (g) | $ZnCO_3$ | 0.433 | 0.4328 | 0.4323 | 0.4312 | 0.428 | 0.423 | 0.434 |
|  | $MoO_3$ | 0.9596 | 0.9596 | 0.9596 | 0.9596 | 0.9596 | 0.9596 | 0.9596 |
|  | $Yb_2O_3$ | 0.0134 | 0.0134 | 0.0134 | 0.0134 | 0.0134 | 0.0134 | 0.0134 |
|  | $Er(NO_3)_3 \cdot 5H_2O$ | 0.0029 | 0.0059 | 0.0088 | 0.0148 | 0.0296 | 0.0592 | — |
|  | $K_2CO_3$ | 0.046 | 0.046 | 0.046 | 0.046 | 0.046 | 0.046 | 0.046 |
| Content ratios of ions (at %) | $Yb^{3+}$ | 10 | 10 | 10 | 10 | 10 | 10 | 10 |
|  | $Er^{3+}$ | 0.1 | 0.2 | 0.3 | 0.5 | 1 | 2 | — |
|  | $K^+$ | 10 | 10 | 10 | 10 | 10 | 10 | 10 |

Examples 27 to 31 and Comparative Example 4

As each of the samples according to Examples 27 to 31, a powder represented by $ZnMoO_4:Yb^{3+},Er^{3+},K^+$ and having the content ratios of $Yb^{3+}$, $Er^{3+}$ and $K^+$ as shown in Table 6 presented below was obtained in the same manner as in Example 1 except that the powder used as the raw material was altered as shown in Table 6 presented below.

Similarly, as the sample according to Comparative Example 4, a powder represented by $ZnMoO_4:Er^{3+},K^+$ and having the content ratios of $Er^{3+}$ and $K^+$ as shown in Table 6 presented below was obtained.

TABLE 6

|  |  | Example 27 | Example 28 | Example 29 | Example 30 | Example 31 | Comparative Example 4 |
|---|---|---|---|---|---|---|---|
| Amounts used of raw material powders (g) | $ZnCO_3$ | 0.46 | 0.455 | 0.44 | 0.412 | 0.406 | 0.433 |
|  | $MoO_3$ | 0.9596 | 0.9596 | 0.9596 | 0.9596 | 0.9596 | 0.9596 |
|  | $Yb_2O_3$ | 0.066 | 0.0792 | 0.099 | 0.165 | 0.197 | — |
|  | $Er(NO_3)_3 \cdot 5H_2O$ | 0.0029 | 0.0029 | 0.0029 | 0.0029 | 0.0029 | 0.0029 |
|  | $K_2CO_3$ | 0.046 | 0.046 | 0.046 | 0.046 | 0.046 | 0.046 |
| Content ratios of ions (at %) | $Yb^{3+}$ | 5 | 6 | 7.5 | 12.5 | 15 | — |
|  | $Er^{3+}$ | 0.1 | 0.1 | 0.1 | 0.1 | 0.1 | 0.1 |
|  | $K^+$ | 10 | 10 | 10 | 10 | 10 | 10 |

Examples 32 to 34 and Comparative Example 5

As each of the samples according to Examples 32 to 34, a powder represented by $ZnMoO_4:Yb^{3+},Er^{3+},M^+$ and having the content ratios of $Yb^{3+}$, $Er^{3+}$ and $M^+$ as shown in Table 7 presented below was obtained in the same manner as in Example 1 except that the powder used as the raw material was altered as shown in Table 7 presented below. It is to be noted that $M^+$ represents any of $K^+$, $Na^+$, $Li^+$ and $Rb^+$.

Similarly, as the sample according to Comparative Example 5, a powder represented by $ZnMoO_4:Yb^{3+},Er^{3+}$ and having the content ratios of $Yb^{3+}$ and $Er^{3+}$ as shown in Table 7 presented below was obtained.

TABLE 7

|  |  | Example 32 | Example 33 | Example 34 | Comparative Example 5 |
|---|---|---|---|---|---|
| Amounts used of raw material powders (g) | $ZnCO_3$ | 0.433 | 0.433 | 0.433 | 0.487 |
|  | $MoO_3$ | 0.9596 | 0.9596 | 0.9596 | 0.9596 |
|  | $Yb_2O_3$ | 0.134 | 0.134 | 0.134 | 0.134 |
|  | $Er(NO_3)_3 \cdot 5H_2O$ | 0.0029 | 0.0029 | 0.0029 | 0.0029 |
|  | $K_2CO_3$ | — | — | — | — |
|  | $Na_2CO_3$ | 0.0354 | — | — | — |
|  | $Li_2CO_3$ | — | 0.025 | — | — |
|  | $Rb_2CO_3$ | — | — | 0.077 | — |
| Content ratios of ions (at %) | $Yb^{3+}$ | 10 | 10 | 10 | 10 |
|  | $Er^{3+}$ | 0.1 | 0.1 | 0.1 | 0.1 |
|  | $K^+$ | — | — | — | — |
|  | $Na^+$ | 10 | — | — | — |
|  | $Li^+$ | — | 10 | — | — |
|  | $Rb^+$ | — | — | 10 | — |

Examples 35 to 38

As each of the samples according to Examples 35 to 38, a powder represented by $ZnMoO_4:Yb^{3+},Er^{3+},K^+$ and having the content ratios of $Yb^{3+}$, $Er^{3+}$ and $K^+$ as shown in Table 8 presented below was obtained in the same manner as in Example 1 except that the powder used as the raw material was altered as shown in Table 8 presented below.

TABLE 8

|  |  | Example 35 | Example 36 | Example 37 | Example 38 |
|---|---|---|---|---|---|
| Amounts used of raw material powders (g) | $ZnCO_3$ | 0.46 | 0.44 | 0.412 | 0.406 |
|  | $MoO_3$ | 0.9596 | 0.9596 | 0.9596 | 0.9596 |
|  | $Yb_2O_3$ | 0.134 | 0.134 | 0.134 | 0.134 |
|  | $Er(NO_3)_3 \cdot 5H_2O$ | 0.0029 | 0.0029 | 0.0029 | 0.0029 |
|  | $K_2CO_3$ | 0.023 | 0.035 | 0.058 | 0.069 |
| Content ratios of ions (at %) | $Yb^{3+}$ | 10 | 10 | 10 | 10 |
|  | $Er^{3+}$ | 0.1 | 0.1 | 0.1 | 0.1 |
|  | $K^+$ | 5 | 7.5 | 12.5 | 15 |

Examples 39 to 46

As each of the samples according to Examples 39 to 46, a powder represented by $ZnMoO_4:Yb^{3+},Ho^{3+},K^+$ and having the content ratios of $Yb^{3+}$, $Ho^{3+}$ and $K^+$ as shown in Table 9 presented below was obtained in the same manner as in Example 1 except that the powder used as the raw material was altered as shown in Table 9 presented below.

TABLE 9

|  |  | Example 39 | Example 40 | Example 41 | Example 42 | Example 43 | Example 44 | Example 45 | Example 46 |
|---|---|---|---|---|---|---|---|---|---|
| Amounts used of raw material powders (g) | $ZnCO_3$ | 0.434 | 0.4337 | 0.433 | 0.4328 | 0.432 | 0.431 | 0.428 | 0.423 |
|  | $MoO_3$ | 0.9596 | 0.9596 | 0.9596 | 0.9596 | 0.9596 | 0.9596 | 0.9596 | 0.9596 |
|  | $Yb_2O_3$ | 0.134 | 0.134 | 0.134 | 0.134 | 0.134 | 0.134 | 0.134 | 0.134 |
|  | $Ho(NO_3)_3 \cdot 5H_2O$ | 0.0015 | 0.0015 | 0.0029 | 0.0059 | 0.0078 | 0.015 | 0.0296 | 0.06 |
|  | $K_2CO_3$ | 0.046 | 0.046 | 0.046 | 0.046 | 0.046 | 0.046 | 0.046 | 0.046 |
| Content ratios of ions (at %) | $Yb^{3+}$ | 10 | 10 | 10 | 10 | 10 | 10 | 10 | 10 |
|  | $Ho^{3+}$ | 0.03 | 0.05 | 0.1 | 0.2 | 0.3 | 0.5 | 1 | 2 |
|  | $K^+$ | 10 | 10 | 10 | 10 | 10 | 10 | 10 | 10 |

Examples 47 to 51 and Comparative Example 6

As each of the samples according to Examples 47 to 51, a powder represented by $ZnMoO_4:Yb^{3+},Ho^{3+},K^+$ and having the content ratios of $Yb^{3+}$, $Ho^{3+}$ and $K^+$ as shown in Table 10 presented below was obtained in the same manner as in Example 1 except that the powder used as the raw material was altered as shown in Table 10 presented below.

Similarly, as the sample according to Comparative Example 6, a powder represented by $ZnMoO_4:Ho^{3+},K^+$ and having the content ratios of $Ho^{3+}$ and $K^+$ as shown in Table 10 presented below was obtained.

TABLE 10

|  |  | Example 47 | Example 48 | Example 49 | Example 50 | Example 51 | Comparative Example 6 |
|---|---|---|---|---|---|---|---|
| Amounts used of raw material powders (g) | $ZnCO_3$ | 0.46 | 0.44 | 0.412 | 0.406 | 0.379 | 0.487 |
|  | $MoO_3$ | 0.9596 | 0.9596 | 0.9596 | 0.9596 | 0.9596 | 0.9596 |
|  | $Yb_2O_3$ | 0.066 | 0.099 | 0.165 | 0.197 | 0.263 | — |
|  | $Ho(NO_3)_3 \cdot 5H_2O$ | 0.0029 | 0.0029 | 0.0029 | 0.0029 | 0.0029 | 0.0029 |
|  | $K_2CO_3$ | 0.046 | 0.046 | 0.046 | 0.046 | 0.046 | 0.046 |
| Content ratios of ions (at %) | $Yb^{3+}$ | 5 | 7.5 | 12.5 | 15 | 20 | — |
|  | $Ho^{3+}$ | 0.1 | 0.1 | 0.1 | 0.1 | 0.1 | 0.1 |
|  | $K^+$ | 10 | 10 | 10 | 10 | 10 | 10 |

Examples 52 to 54 and Comparative Example 7

As each of the samples according to Examples 52 to 54, a powder represented by $ZnMoO_4:Yb^{3+},Ho^{3+},M^+$ and having the content ratios of $Yb^{3+}$, $Ho^{3+}$ and $M^+$ as shown in Table 11 presented below was obtained in the same manner as in Example 1 except that the powder used as the raw material was altered as shown in Table 11 presented below. It is to be noted that $M^+$ represents any of $K^+$, $Na^+$, $Li^+$ and $Rb^+$.

Similarly, as the sample according to Comparative Example 7, a powder represented by $ZnMoO_4:Yb^{3+},Ho^{3+}$ and having the content ratios of $Yb^{3+}$ and $Ho^{3+}$ as shown in Table 11 presented below was obtained.

TABLE 11

|  |  | Example 52 | Example 53 | Example 54 | Comparative Example 7 |
|---|---|---|---|---|---|
| Amounts used of raw material powders (g) | $ZnCO_3$ | 0.433 | 0.433 | 0.433 | 0.487 |
|  | $MoO_3$ | 0.9596 | 0.9596 | 0.9596 | 0.9596 |
|  | $Yb_2O_3$ | 0.134 | 0.134 | 0.134 | 0.134 |
|  | $Ho(NO_3)_3 \cdot 5H_2O$ | 0.0029 | 0.0029 | 0.0029 | 0.0029 |
|  | $K_2CO_3$ | — | — | — | — |
|  | $Na_2CO_3$ | 0.0354 | — | — | — |
|  | $Li_2CO_3$ | — | 0.025 | — | — |
|  | $Rb_2CO_3$ | — | — | 0.077 | — |
| Content ratios of ions (at %) | $Yb^{3+}$ | 10 | 10 | 10 | 10 |
|  | $Ho^{3+}$ | 0.1 | 0.1 | 0.1 | 0.1 |
|  | $K^+$ | — | — | — | — |
|  | Na | 10 | — | — | — |
|  | Li | — | 10 | — | — |
|  | $Rb^|$ | — | — | 10 | — |

Examples 55 to 58

As each of the samples according to Examples 55 to 58, a powder represented by $ZnMoO_4:Yb^{3+},Ho^{3+},K^+$ and having the content ratios of $Yb^{3+}$, $Ho^{3+}$ and $K^+$ as shown in Table 12 presented below was obtained in the same manner as in Example 1 except that the powder used as the raw material was altered as shown in Table 12 presented below.

TABLE 12

|  |  | Example 55 | Example 56 | Example 57 | Example 58 |
|---|---|---|---|---|---|
| Amounts used of raw material powders (g) | $ZnCO_3$ | 0.46 | 0.44 | 0.412 | 0.406 |
|  | $MoO_3$ | 0.9596 | 0.9596 | 0.9596 | 0.9596 |
|  | $Yb_2O_3$ | 0.134 | 0.134 | 0.134 | 0.134 |
|  | $Ho(NO_3)_3 \cdot 5H_2O$ | 0.0029 | 0.0029 | 0.0029 | 0.0029 |
|  | $K_2CO_3$ | 0.023 | 0.0345 | 0.0575 | 0.069 |
| Content ratios of ions (at %) | $Yb^{3+}$ | 10 | 10 | 10 | 10 |
|  | $Ho^{3|}$ | 0.1 | 0.1 | 0.1 | 0.1 |
|  | $K^+$ | 5 | 7.5 | 12.5 | 15 |

Examples 59 to 62

As each of the samples according to Examples 59 to 62, a powder represented by $ZnMoO_4:Yb^{3+},Tm^{3+},Ho^{3+},K^+$ and having the content ratios of $Yb^{3+}$, $Tm^{3+}$, $Ho^{3+}$ and $K^+$ as shown in Table 13 presented below was obtained in the same manner as in Example 1 except that the powder used as the raw material was altered as shown in Table 13 presented below.

TABLE 13

|  |  | Example 59 | Example 60 | Example 61 | Example 62 |
|---|---|---|---|---|---|
| Amounts used of raw material powders (g) | $ZnCO_3$ | 0.4334 | 0.4331 | 0.4334 | 0.4331 |
|  | $MoO_3$ | 0.9596 | 0.9596 | 0.9596 | 0.9596 |
|  | $Yb_2O_3$ | 0.131 | 0.131 | 0.131 | 0.131 |

TABLE 13-continued

|  |  | Example 59 | Example 60 | Example 61 | Example 62 |
|---|---|---|---|---|---|
|  | TmCl$_3$•6H$_2$O | 0.0013 | 0.0013 | 0.0027 | 0.0027 |
|  | Er(NO$_3$)$_3$•5H$_2$O | — | — | — | — |
|  | Ho(NO$_3$)$_3$•5H$_2$O | 0.0015 | 0.0029 | 0.0029 | 0.0015 |
|  | K$_2$CO$_3$ | 0.046 | 0.046 | 0.046 | 0.046 |
| Content ratios of ions (at %) | Yb$^{3+}$ | 10 | 10 | 10 | 10 |
|  | Tm$^{3+}$ | 0.05 | 0.05 | 0.1 | 0.1 |
|  | Er$^{3+}$ | — | — | — | — |
|  | Ho$^{3+}$ | 0.05 | 0.1 | 0.1 | 0.05 |
|  | K$^+$ | 10 | 10 | 10 | 10 |

Examples 63 to 65

As each of the samples according to Examples 63 to 65, a powder represented by ZnMoO$_4$:Yb$^{3+}$,Tm$^{3+}$,Er$^{3+}$,K$^+$ and having the content ratios of Yb$^{3+}$, Tm$^{3+}$, Er$^{3+}$ and K$^+$ as shown in Table 14 presented below was obtained in the same manner as in Example 1 except that the powder used as the raw material was altered as shown in Table 14 presented below.

TABLE 14

|  |  | Example 63 | Example 64 | Example 65 |
|---|---|---|---|---|
| Amounts used of raw material powders (g) | ZnCO$_3$ | 0.4334 | 0.433 | 0.428 |
|  | MoO$_3$ | 0.9596 | 0.9596 | 0.9596 |
|  | Yb$_2$O$_3$ | 0.131 | 0.131 | 0.131 |
|  | TmCl$_3$•6H$_2$O | 0.0027 | 0.0027 | 0.0027 |
|  | Er(NO$_3$)$_3$•5H$_2$O | 0.0029 | 0.0058 | 0.029 |
|  | Ho(NO$_3$)$_3$•5H$_2$O | — | — | — |
|  | K$_2$CO$_3$ | 0.046 | 0.046 | 0.046 |
| Content ratios of ions (at %) | Yb$^{3+}$ | 10 | 10 | 10 |
|  | Tm$^{3+}$ | 0.1 | 0.1 | 0.1 |
|  | Er$^{3+}$ | 0.1 | 0.2 | 1 |
|  | Ho$^{3+}$ | — | — | — |
|  | K$^+$ | 10 | 10 | 10 |

TABLE 15

|  |  | Example 66 | Example 67 | Example 68 |
|---|---|---|---|---|
| Amounts used of raw material powders (g) | ZnCO$_3$ | 0.4323 | 0.4323 | 0.432 |
|  | MoO$_3$ | 0.9596 | 0.9596 | 0.9596 |
|  | Yb$_2$O$_3$ | 0.131 | 0.131 | 0.131 |
|  | TmCl$_3$•6H$_2$O | — | — | — |
|  | Er(NO$_3$)$_3$•5H$_2$O | 0.0029 | 0.0058 | 0.0058 |
|  | Ho(NO$_3$)$_3$•5H$_2$O | 0.0059 | 0.0029 | 0.0059 |
|  | K$_2$CO$_3$ | 0.046 | 0.046 | 0.046 |
| Content ratios of ions (at %) | Yb$^{3+}$ | 10 | 10 | 10 |
|  | Tm$^{3+}$ | — | — | — |
|  | Er$^{3+}$ | 0.1 | 0.2 | 0.2 |
|  | Ho$^{3+}$ | 0.2 | 0.1 | 0.2 |
|  | K$^+$ | 10 | 10 | 10 |

Examples 69 to 74

As each of the samples according to Examples 69 to 74, a powder represented by ZnMoO$_4$:Yb$^{3+}$,Tm$^{3+}$,Er$^{3+}$,Ho$^{3+}$,K$^+$ and having the content ratios of Yb$^{3+}$, Tm$^{3+}$, Er$^{3+}$, Ho$^{3+}$ and K$^+$ as shown in Table 16 presented below was obtained in the same manner as in Example 1 except that the powder used as the raw material was altered as shown in Table 16 presented below.

TABLE 16

|  |  | Example 69 | Example 70 | Example 71 | Example 72 | Example 73 | Example 74 |
|---|---|---|---|---|---|---|---|
| Amounts used of raw material powders (g) | ZnCO$_3$ | 0.4332 | 0.433 | 0.4328 | 0.4331 | 0.4323 | 0.432 |
|  | MoO$_3$ | 0.9596 | 0.9596 | 0.9596 | 0.9596 | 0.9596 | 0.9596 |
|  | Yb$_2$O$_3$ | 0.131 | 0.131 | 0.131 | 0.131 | 0.131 | 0.131 |
|  | TmCl$_3$•6H$_2$O | 0.0013 | 0.0013 | 0.0013 | 0.0027 | 0.0027 | 0.0054 |
|  | Er(NO$_3$)$_3$•5H$_2$O | 0.0001 | 0.0003 | 0.003 | 0.0003 | 0.003 | 0.006 |
|  | Ho(NO$_3$)$_3$•5H$_2$O | 0.0015 | 0.0015 | 0.0015 | 0.0015 | 0.0029 | 0.0059 |
|  | K$_2$CO$_3$ | 0.046 | 0.046 | 0.046 | 0.046 | 0.046 | 0.046 |
| Content ratios of ions (at %) | Yb$^{3+}$ | 10 | 10 | 10 | 10 | 10 | 10 |
|  | Tm$^{3+}$ | 0.05 | 0.05 | 0.05 | 0.1 | 0.1 | 0.2 |
|  | Er$^{3+}$ | 0.005 | 0.01 | 0.1 | 0.01 | 0.1 | 0.2 |
|  | Ho$^{3+}$ | 0.05 | 0.05 | 0.05 | 0.05 | 0.1 | 0.2 |
|  | K$^+$ | 10 | 10 | 10 | 10 | 10 | 10 |

Examples 66 to 68

As each of the samples according to Examples 66 to 68, a powder represented by ZnMoO$_4$:Yb$^{3+}$,Er$^{3+}$,Ho$^{3+}$,K$^+$ and having the content ratios of Yb$^{3+}$, Er$^{3+}$, Ho$^{3+}$ and K$^+$ as shown in Table 15 presented below was obtained in the same manner as in Example 1 except that the powder used as the raw material was altered as shown in Table 15 presented below.

Examples 75 to 79

As the samples according to Examples 75 to 79, powders represented by ZnMoO$_4$:Yb$^{3+}$,Tm$^{3+}$,K$^+$ and having the content ratios of Yb$^{3+}$, Tm$^{3+}$ and K$^+$ of 10 at %, 0.1 at % and 10 at %, respectively were obtained in the same manner as in Example 1 except that the burning temperatures of the pellets were altered to 550° C., 600° C., 700° C., 750° C. and 800° C. in Examples 75 to 79, respectively.

[Physical Property Evaluation 1: Identification of Sample]

Crystal phase identification was performed by XRD for each of the samples of foregoing Examples 1, 75 and 79. As an X-ray diffractometer, "XRD-6300" manufactured by Shimadzu Corp. was used and CuKα was employed. The results thus obtained are shown in FIG. 1.

Figure 2:
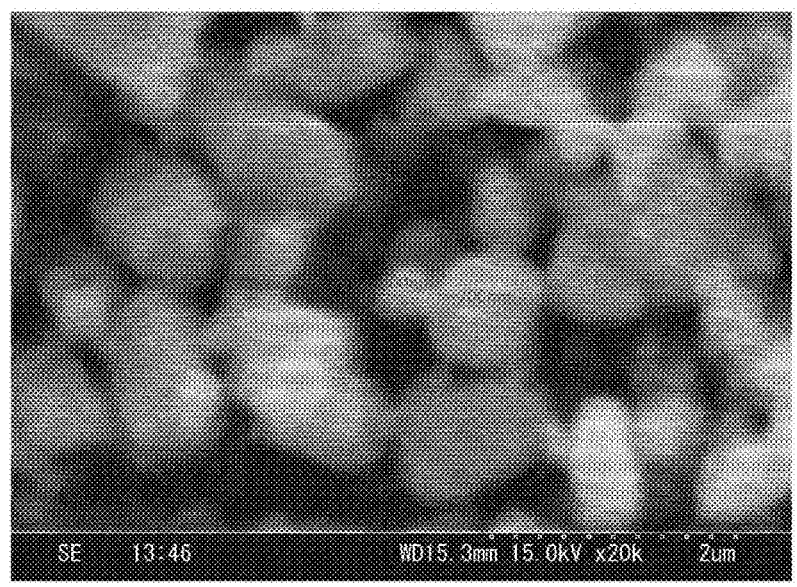
FIG. 2 is the scanning electron microscope (SEM) image of the sample of Example 1.

For the sample of Example 1, a scanning electron microscope (SEM) image is shown in FIG. 2.

From the results shown in FIGS. 1 and 2, by the operations shown in each of above-described Examples, the target up-conversion phosphors were verified to be obtained as fine powder forms.

[Physical Property Evaluation 2: Light-Emitting Properties]

For each of the samples according to foregoing Examples and Comparative Examples, the light emission spectrum observed by irradiation of the sample with 980-nm laser light was measured with "USB 4000 UV/VIS/NIR" (miniature optical fiber spectrophotometer, manufactured by Ocean Optics, Inc.). The measurement was performed at room temperature.

The results thus obtained are as shown in FIGS. 3 to 25.

Hereinafter, on the results shown in FIGS. 3 to 25, the overall considerations are shown (the following (1)), and then specific considerations (the following (2) to (6)) are shown on the effects due to, for example, the types and contents of the respective components on the light-emitting properties.

(1) Overall Considerations

In the samples of Examples 1 to 20 and 75 to 79 in which $Yb^{3+}$ was added as the rare earth metal ion, peaks were found around 480 nm and 800 nm.

In these samples, the light-emitting color observed by the human visual sense was blue, and this is inferred to be due to the light emission corresponding to the peaks around 480 nm. The peaks around 800 nm correspond to near infrared light emission, fall in the wavelength region outside the visible region, and accordingly are not observed by the visible human sense.

In the samples of Examples 21 to 38 in which $Er^{3+}$ was added as the rare earth metal ion, peaks were found around 520 to 565 nm and 630 to 670 nm.

In these samples, the light-emitting color observed by the human visual sense was bright green, this is mainly due to the light emission corresponding to the peaks around 520 to 565 nm, and the light-emitting color is inferred to be somewhat affected by the light emission corresponding to the small peaks around 630 to 670 nm.

In the samples of Examples 39 to 58 in which $Ho^{3+}$ was added as the rare earth metal ion, peaks were found around 550 nm and 650 nm.

In these samples, the light-emitting color observed by the human visual sense was bright red-orange color, this is mainly due to the light emission corresponding to the peak around 650 nm, and this is inferred to be affected by the light emission corresponding to the peak around 550 nm.

In the samples of Examples 59 to 74 in which two or more of $Tm^{3+}$, $Er^{3+}$ and $Ho^{3+}$ were added in combination as the rare earth metal ions, according to the combinations, the peaks around 480 nm inferred to be due to $Tm^{3+}$, the peaks around 550 nm inferred to be due to $Er^{3+}$ and $Ho^{3+}$, and the peaks around 650 nm inferred to be due to $Ho^{3+}$ were found.

In these samples, the light-emitting color observed by the human visual sense was white in the cases (Examples 59 to 62) of the combination of $Tm^{3+}$ and $Ho^{3+}$, blue to green in the cases (Examples 63 to 65) of the combination of $Tm^{3+}$ and $Er^{3+}$, yellow in the cases (Examples 66 to 68) of the combination of $Er^{3+}$ and $Ho^{3+}$, and various colors such as white, blue to green, and yellow in the cases (Examples 69 to 74) of the combinations of $Tm^{3+}$, $Er^{3+}$ and $Ho^{3+}$, according to the mutual proportions of these three rare earth metal ions.

These light-emitting colors are inferred to be caused by the combinations of the light emissions of a plurality of wavelengths, originating from the respective rare earth metal ions.

Figure 3:
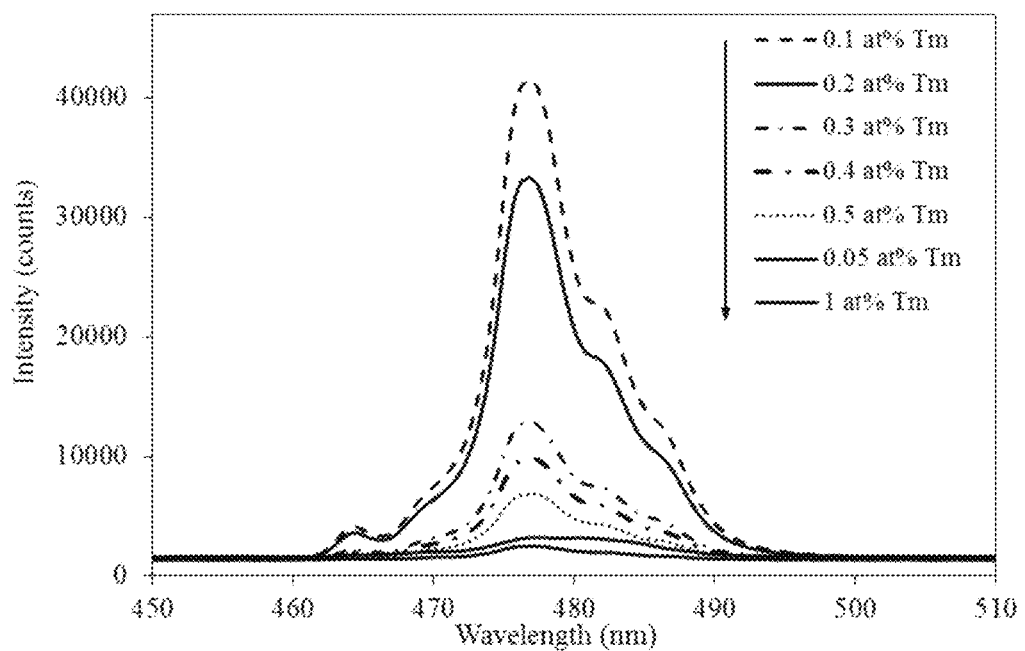
FIG. 3 is a graph showing the light emission spectra, in the wavelength region from 450 to 510 nm, of the samples of Examples 1 to 7.
Figure 4:
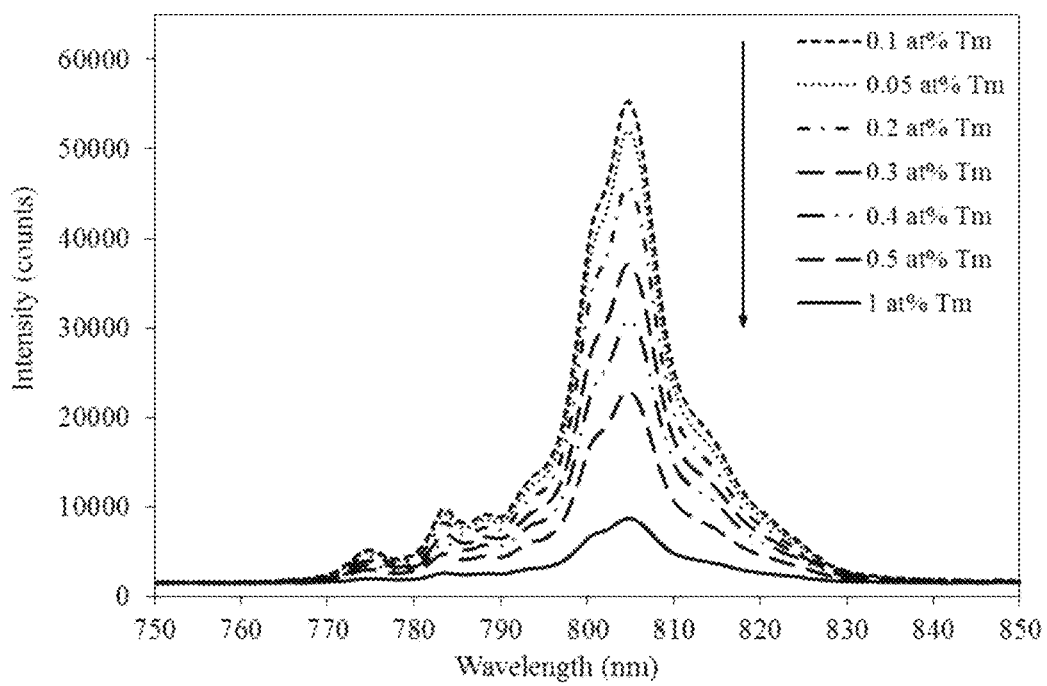
FIG. 4 is a graph showing the light emission spectra, in the wavelength region from 750 to 850 nm, of the samples of Examples 1 to 7.

(2) Discussion on $Tm^{3+}$-Containing Up-Conversion Phosphor (2-1) Effect of the Content of $Tm^{3+}$ on the Light-Emitting Properties FIGS. 3 and 4 show the measurement results (FIG. 3: the wavelength region from 450 to 510 nm; FIG. 4: the wavelength region from 750 to 850 nm) of the light emission spectra of the samples of Examples 1 to 7.

From the results shown in FIGS. 3 and 4, it has been able to verify that the content ratio of $Tm^{3+}$ affects the light-emitting properties, and it has also been able to verify that in order to obtain excellent light-emitting properties, the content of $Tm^{3+}$ is preferably within a range from 0.05 to 1 at %, and in particular, within a range from 0.05 to 0.5 at %.

(2-2) Effect of the Content of $Yb^{3+}$ on the Light-Emitting Properties

Figure 5:
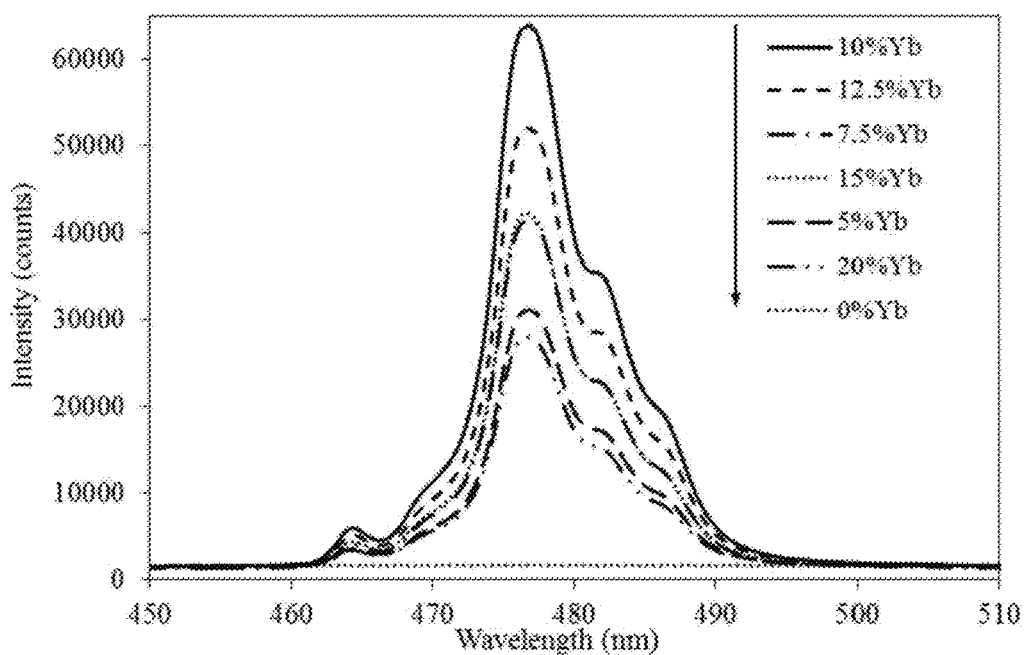
FIG. 5 is a graph showing the light emission spectra, in the wavelength region from 450 to 510 nm, of the samples of Examples 1 and 8 to 12, and Comparative Example 1.
Figure 6:
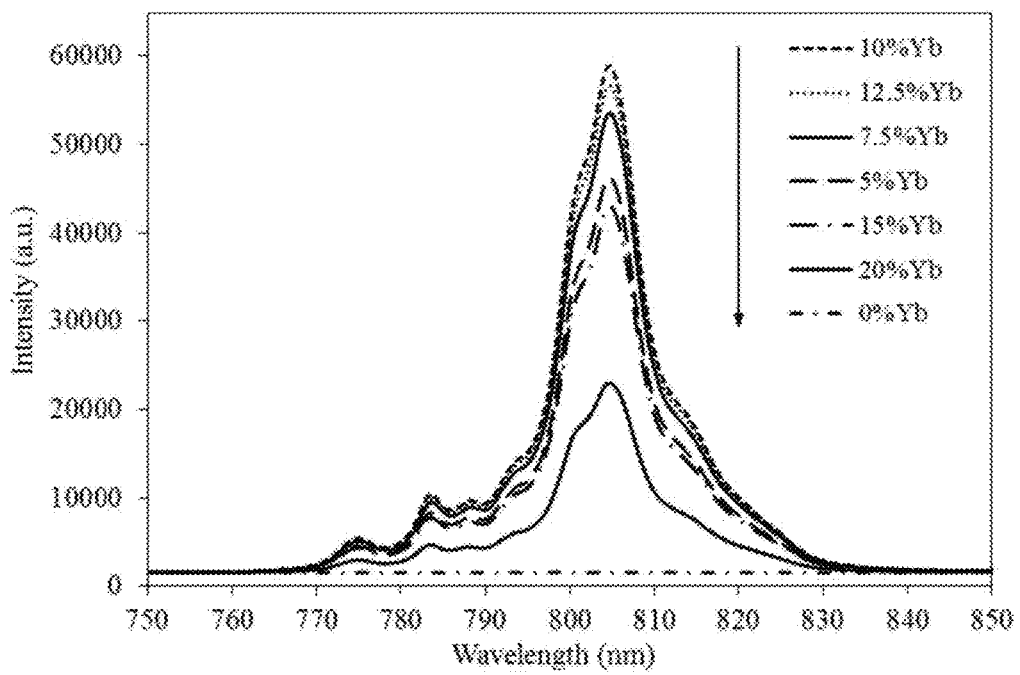
FIG. 6 is a graph showing the light emission spectra, in the wavelength region from 750 to 850 nm, of the samples of Examples 1 and 8 to 12, and Comparative Example 1.

FIGS. 5 and 6 show the measurement results (FIG. 5: the wavelength region from 450 to 510 nm; FIG. 6: the wavelength region from 750 to 850 nm) of the light emission spectra of the samples of Examples 1 and 8 to 12, and Comparative Example 1.

In the results shown in FIGS. 5 and 6, in the first place, from a comparison of Comparative Example 1 (not including $Yb^{3+}$) with other Examples concerned, it has been able to verify that $Yb^{3+}$ is an essential component to be included for the purpose of obtaining the targeted up-conversion light emission.

From the results of Examples concerned, it has been able to verify that the content ratio of $Yb^{3+}$ affects the light-emitting properties, and it has also been able to verify that for the purpose of obtaining excellent light-emitting properties, the content ratio of $Yb^{3+}$ is preferably 20 at % or less, and in particular, within a range from 5 to 15 at %.

Figure 7:
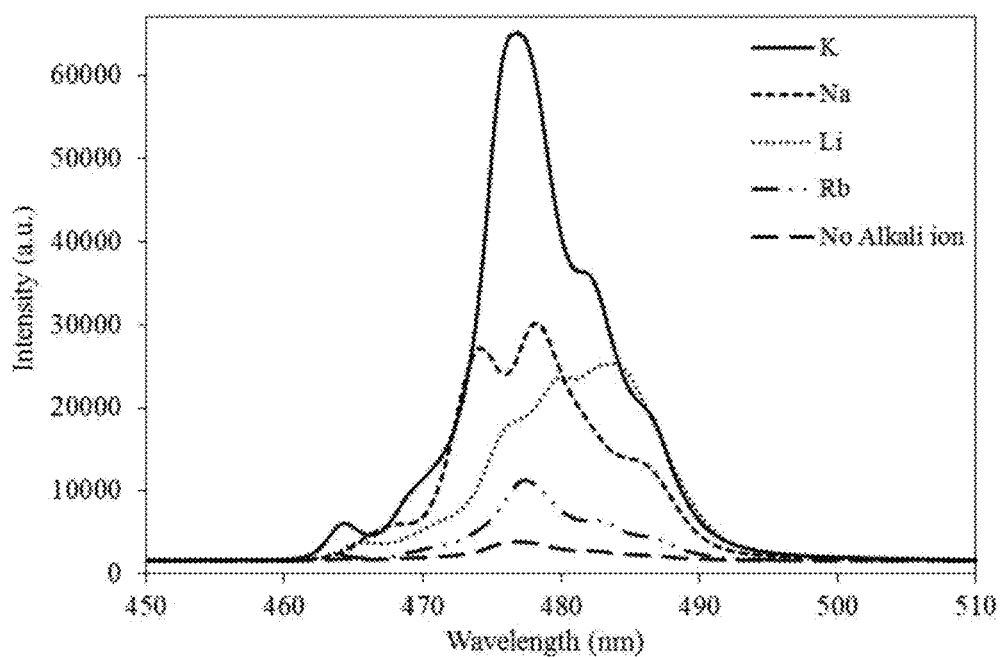
FIG. 7 is a graph showing the light emission spectra, in the wavelength region from 450 to 510 nm, of the samples of Examples 1 and 13 to 15, and Comparative Example 2.
Figure 8:
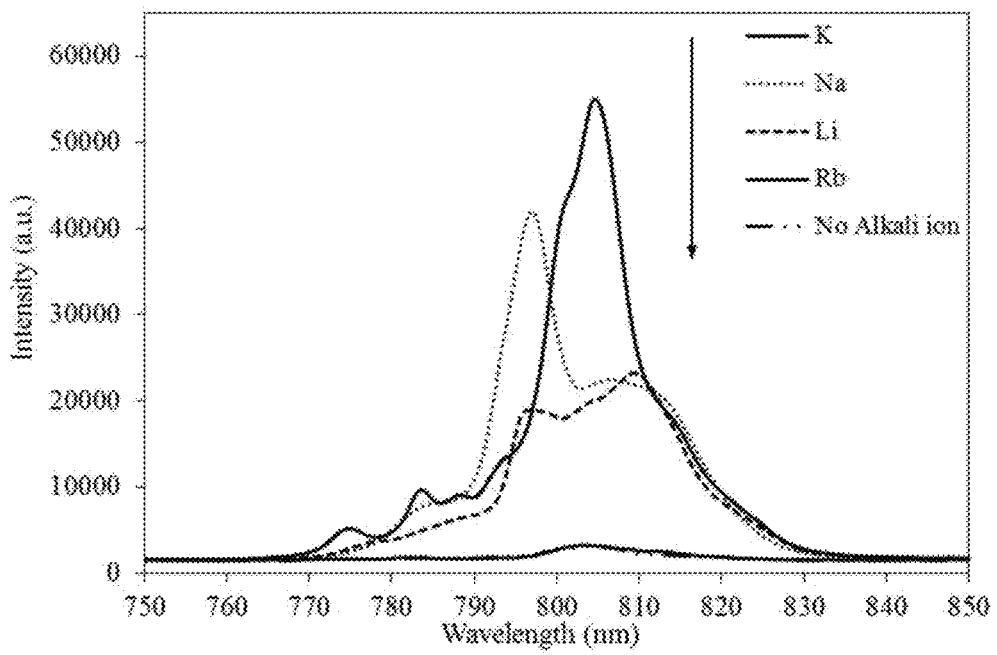
FIG. 8 is a graph showing the light emission spectra, in the wavelength region from 750 to 850 nm, of the samples of Examples 1 and 13 to 15, and Comparative Example 2.

(2-3) Effects of the Inclusion of the Monovalent Metal Ion on the Light-Emitting Properties FIGS. 7 and 8 show the measurement results (FIG. 7: the wavelength region from 450 to 510 nm; FIG. 8: the wavelength region from 750 to 850 nm) of the light emission spectra of the samples of Examples 1 and 13 to 15, and Comparative Example 2.

In the results shown in FIGS. 7 and 8, in the first place, from a comparison of Comparative Example 2 (not including any monovalent metal ion) with other Examples concerned, it has been able to verify that the monovalent metal ion specified in the present invention is the essential component to be included.

From the results of Examples concerned, it has been able to verify that for the purpose of obtaining excellent light-emitting properties, $K^+$, $Na^+$ and $Li^+$ are preferable, $K^+$ and $Na^+$ are more preferable, and $K^+$ is particularly preferable.

Figure 9:
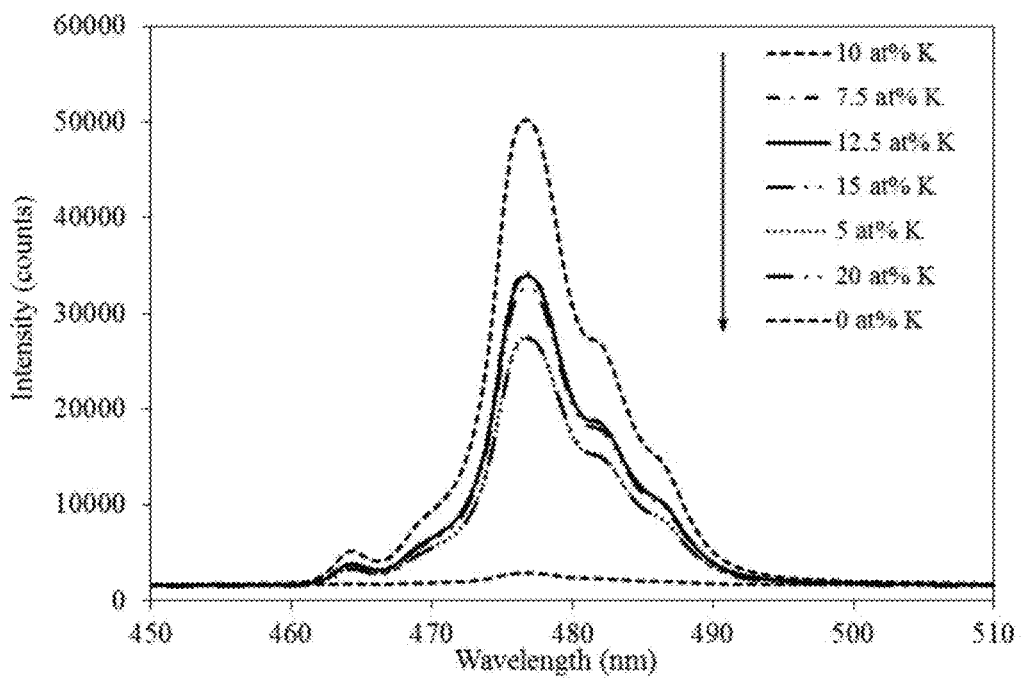
FIG. 9 is a graph showing the light emission spectra, in the wavelength region from 450 to 510 nm, of the samples of Examples 1 and 16 to 20, and Comparative Example 2.
Figure 10:
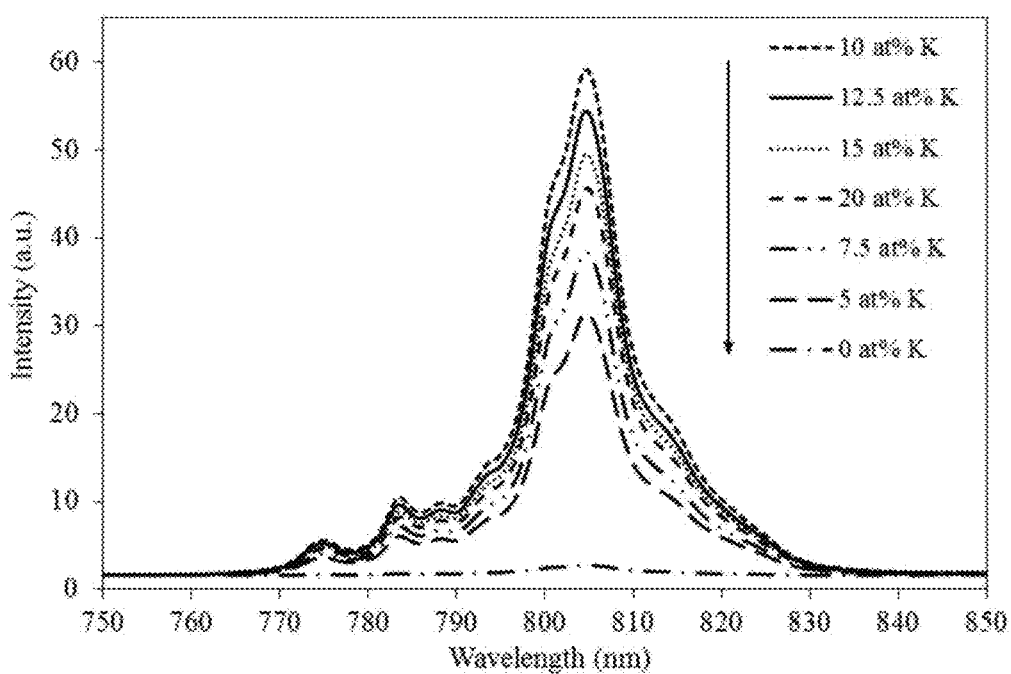
FIG. 10 is a graph showing the light emission spectra, in the wavelength region from 750 to 850 nm, of the samples of Examples 1 and 16 to 20, and Comparative Example 2.

(2-4) Effects of the Content of the Monovalent Metal Ion on the Light-Emitting Properties FIGS. 9 and 10 show the measurement results (FIG. 9: the wavelength region from 450 to 510 nm; FIG. 10: the wavelength region from 750 to 850 nm) of the light emission spectra of the samples of Examples 1 and 16 to 20, and Comparative Example 2.

From the results shown in FIGS. 9 and 10, it has been able to verify that the content ratio of the monovalent metal ion affects the light-emitting properties, and it has also been able to be verified that for the purpose of obtaining excellent light-emitting properties, the content ratio of the monovalent metal ion is preferably 20 at % or less, and in particular, within a range from 5 to 15 at %.

Figure 11:
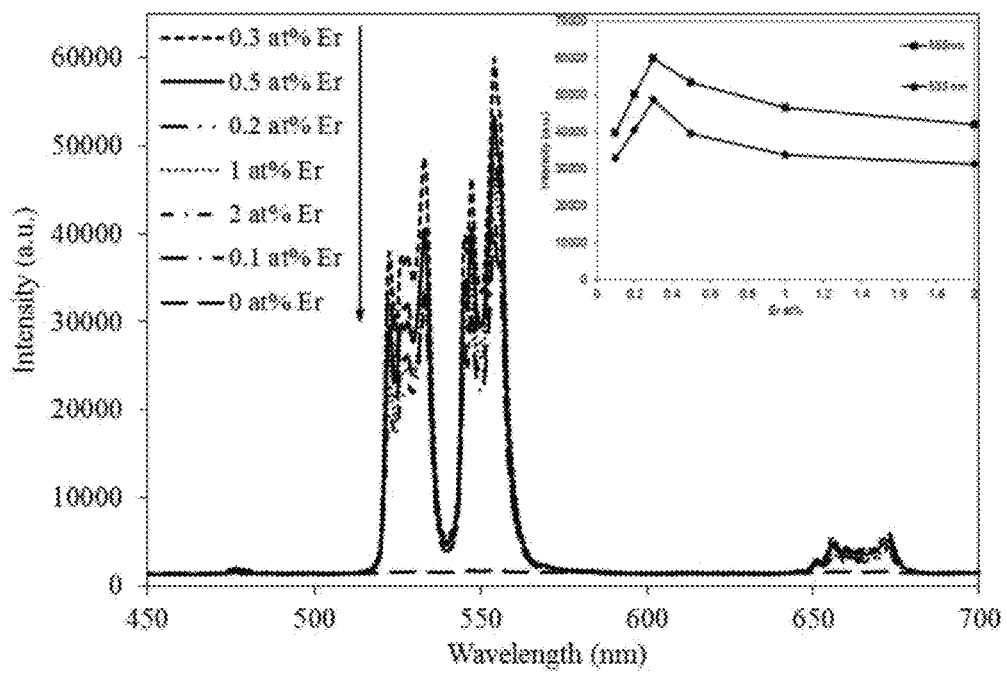
FIG. 11 is a graph showing the light emission spectra of the samples of Examples 21 to 26, and Comparative Example 3.

(3) Discussion on $Er^{3+}$-Containing Up-Conversion Phosphor (3-1) Effects of the Content of $Er^{3+}$ on the Light-Emitting Properties FIG. 11 shows the measurement results of the light emission spectra of the samples of Examples 21 to 26, and Comparative Example 3. FIG. 11 also includes an inserted graph plotting the light emission intensities, at 533 nm and 555 nm, of Examples concerned and Comparative Example concerned.

In the results shown in FIG. 11, in the first place, from a comparison of Comparative Example 3 (not including any rare earth metal ion specified in the present invention) with other Examples concerned, it has been able to verify that the peaks of Examples are the peaks originating from $Er^{3+}$.

From the results of Examples concerned, it has been able to verify that the content ratio of $Er^{3+}$ affects the light-emitting properties, and it has also been able to verify that for the purpose of obtaining excellent light-emitting properties, the content ratio of $Er^{3+}$ is preferably within a range from 0.1 to 2 at %, and in particular, within a range from 0.2 to 0.6 at %.

(3-2) Effects of the Content of $Yb^{3+}$ on the Light-Emitting Properties

Figure 12:
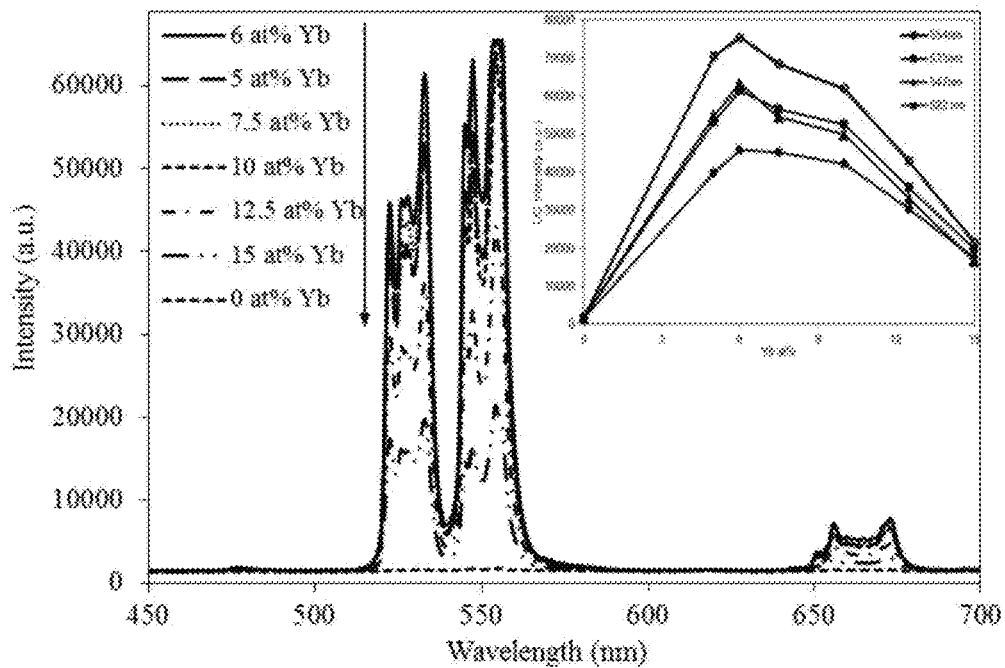
FIG. 12 is a graph showing the light emission spectra of the samples of Examples 21 and 27 to 31, and Comparative Example 4.

FIG. 12 shows the measurement results of the light emission spectra of the samples of Examples 21 and 27 to 31, and Comparative Example 4. FIG. 12 also includes an inserted graph plotting the light emission intensities, at 522 nm, 533 nm, 547 nm and 554 nm, of Examples concerned and Comparative Example concerned.

In the results shown in FIG. 12, in the first place, from a comparison of Comparative Example 4 (not including $Yb^{3+}$) with other Examples concerned, it has been able to verify that $Yb^{3+}$ is an essential component to be included for the purpose of obtaining the targeted up-conversion light emission.

From the results of Examples concerned, it has been able to verify that the content ratio of $Yb^{3+}$ affects the light-emitting properties, and it has also been able to verify that for the purpose of obtaining excellent light-emitting properties, the content ratio of $Yb^{3+}$ is preferably within a range from 5 to 15 at %.

Figure 13:
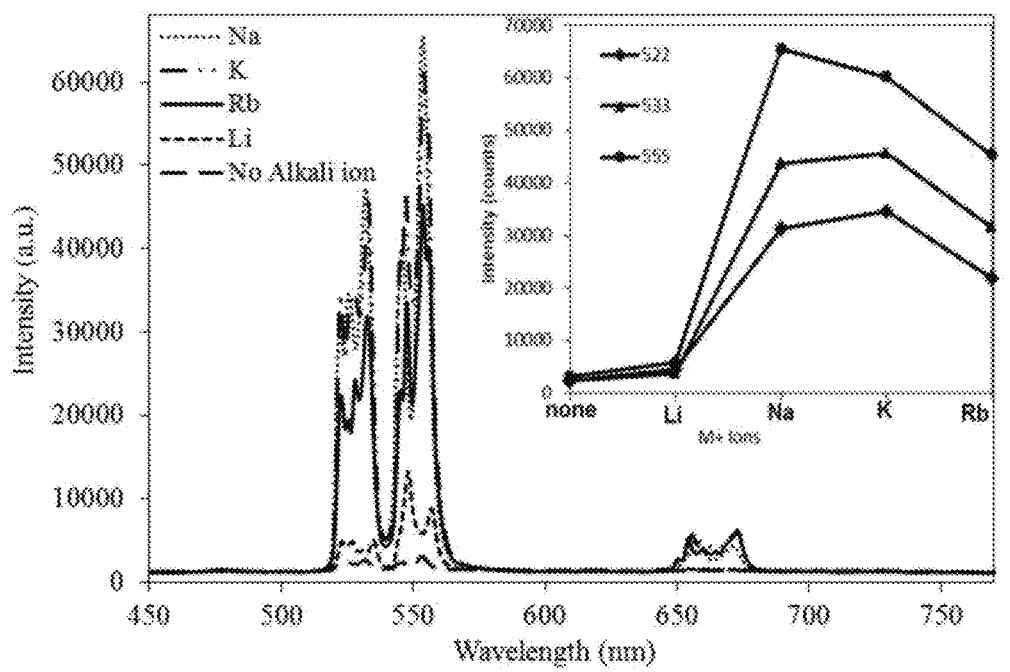
FIG. 13 is a graph showing the light emission spectra of the samples of Examples 21 and 32 to 34, and Comparative Example 5.

(3-3) Effects of the Inclusion of the Monovalent Metal Ion on the Light-Emitting Properties FIG. 13 shows the measurement results of the light emission spectra of the samples of Examples 21 and 32 to 34, and Comparative Example 5. FIG. 13 also includes an inserted graph plotting the light emission intensities, at 522 nm, 533 nm, and 555 nm, of Examples concerned and Comparative Example concerned.

In the results shown in FIG. 13, in the first place, from a comparison of Comparative Example 5 (not including any monovalent metal ion) with other Examples concerned, it has been able to verify that the monovalent metal ion specified in the present invention is an essential component to be included for the purpose of obtaining the targeted up-conversion light emission.

From the results of Examples concerned, it has been able to verify that for the purpose of obtaining excellent light-emitting properties, $K^+$, $Na^+$ and $Rb^+$ are preferable, $K^+$ and $Na^+$ are more preferable, and $K^+$ is particularly preferable.

Figure 14:
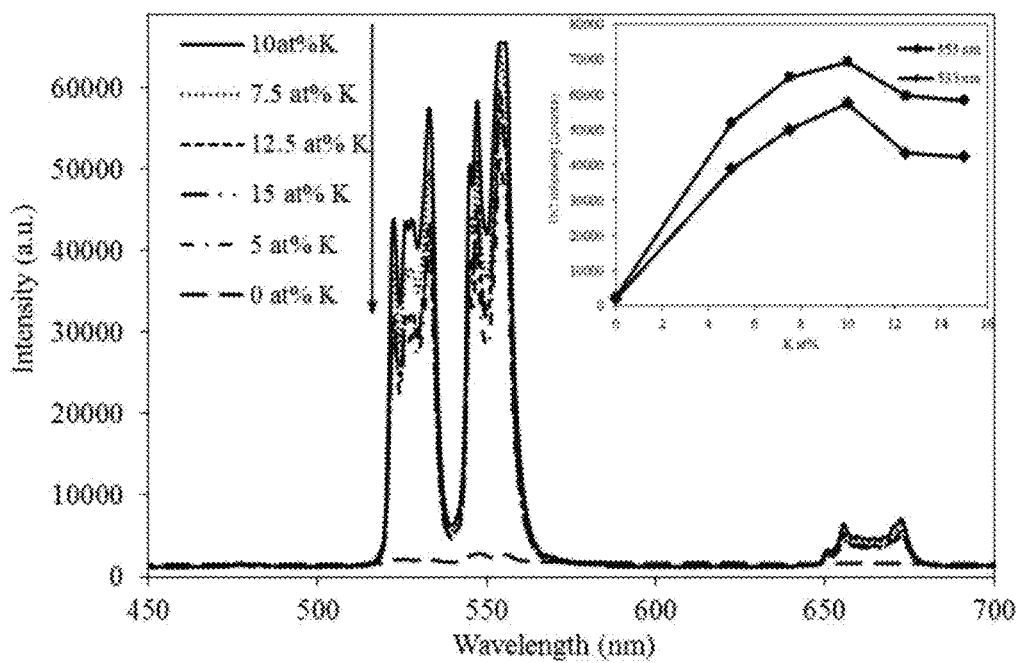
FIG. 14 is a graph showing the light emission spectra of the samples of Examples 21 and 35 to 38, and Comparative Example 5.

(3-4) Effects of the Content of the Monovalent Metal Ion on the Light-Emitting Properties FIG. 14 shows the measurement results of the light emission spectra of the samples of Examples 21 and 35 to 38, and Comparative Example 5. FIG. 14 also includes an inserted graph plotting the light emission intensities, at 533 nm and 555 nm, of Examples concerned and Comparative Example concerned.

From the results shown in FIG. 14, it has been able to verify that the content ratio of the monovalent metal ion affects the light-emitting properties, and it has also been able to verify that for the purpose of obtaining excellent light-emitting properties, the content ratio of the monovalent metal ion is preferably within a range from 5 to 15 at %.

Figure 15:
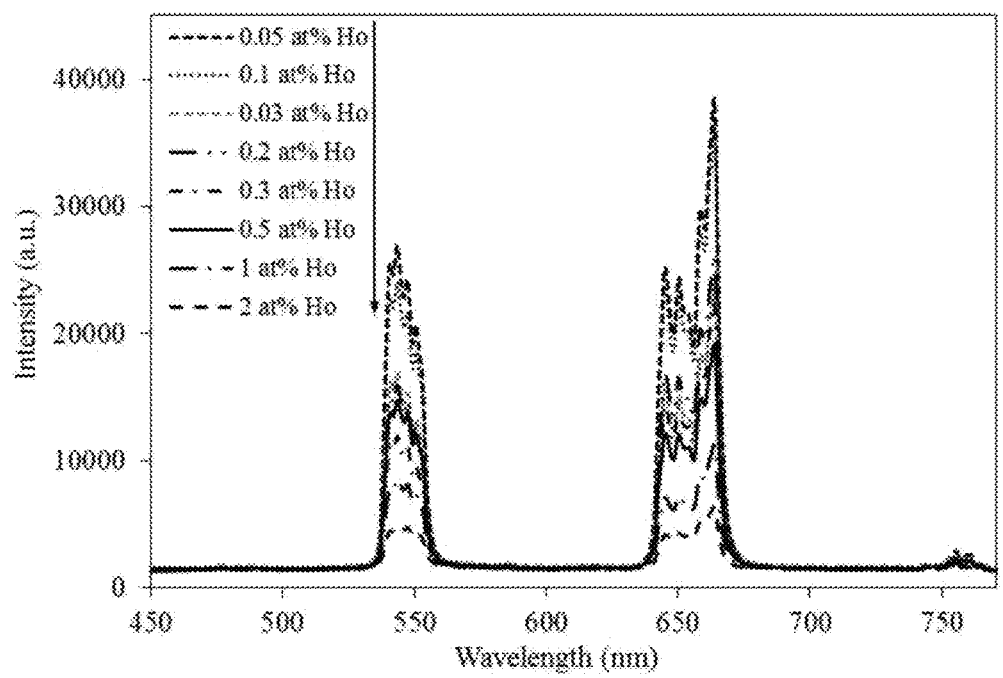
FIG. 15 is a graph showing the light emission spectra of the samples of Examples 39 to 46.

(4) Discussion on $Ho^{3+}$-Containing Up-Conversion Phosphor (4-1) Effects of the Content of $Ho^{3+}$ on the Light-Emitting Properties FIG. 15 shows the measurement results of the light emission spectra of the samples of Examples 39 to 46.

From the results shown in FIG. 15, it has been able to verify that the content ratio of $Ho^{3+}$ affects the light-emitting properties, and it has also been able to verify that for the purpose of obtaining excellent light-emitting properties, the content ratio of $Ho^{3+}$ is preferably 2 at % or less, and in particular, within a range from 0.03 to 1 at %.

(4-2) Effects of the Content of $Yb^{3+}$ on the Light-Emitting Properties

Figure 16:
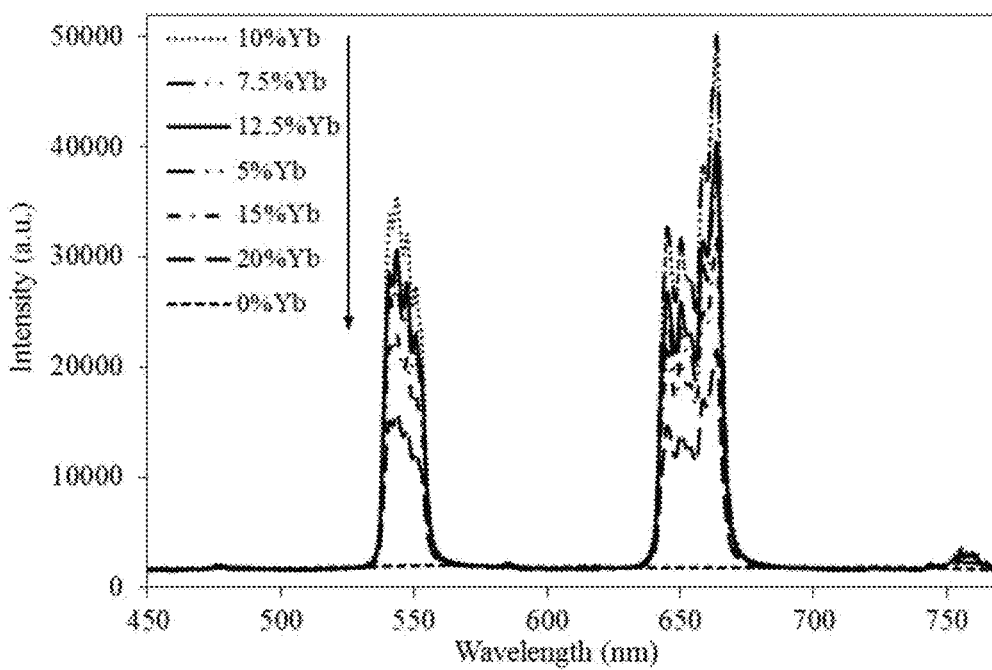
FIG. 16 is a graph showing the light emission spectra of the samples of Examples 41 and 47 to 51, and Comparative Example 6.

FIG. 16 shows the measurement results of the light emission spectra of the samples of Examples 41 and 47 to 51, and Comparative Example 6.

In the results shown in FIG. 16, in the first place, from a comparison of Comparative Example 6 (not including $Yb^{3+}$) with other Examples concerned, it has been able to verify that $Yb^{3+}$ is an essential component to be included for the purpose of obtaining the targeted up-conversion light emission.

From the results of Examples concerned, it has been able to verify that the content ratio of $Yb^{3+}$ affects the light-emitting properties, and it has also been able to verify that for the purpose of obtaining excellent light-emitting properties, the content ratio of $Yb^{3+}$ is preferably 20 at % or less, and in particular, within a range from 5 to 15 at %.

Figure 17:
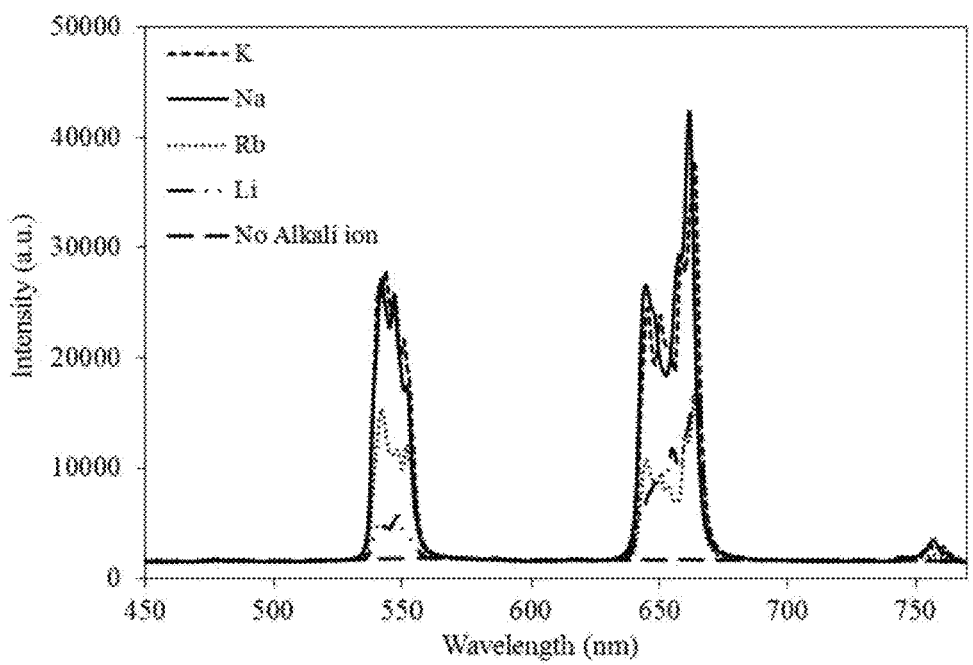
FIG. 17 is a graph showing the light emission spectra of the samples of Examples 41 and 52 to 54, and Comparative Example 7.

(4-3) Effects of the Inclusion of the Monovalent Metal Ion on the Light-Emitting Properties FIG. 17 shows the measurement results of the light emission spectra of the samples of Examples 41 and 52 to 54, and Comparative Example 7.

In the results shown in FIG. 17, in the first place, from a comparison of Comparative Example 7 (not including any monovalent metal ion) with other Examples concerned, it has been able to verify that the monovalent metal ion specified in the present invention is an essential component to be included for the purpose of obtaining the targeted up-conversion light emission.

From the results of Examples concerned, it has been able to verify that for the purpose of obtaining excellent light-emitting properties, $K^+$, $Na^+$ and $Rb^+$ are preferable, and $K^+$ and $Na^+$ are more preferable.

Figure 18:
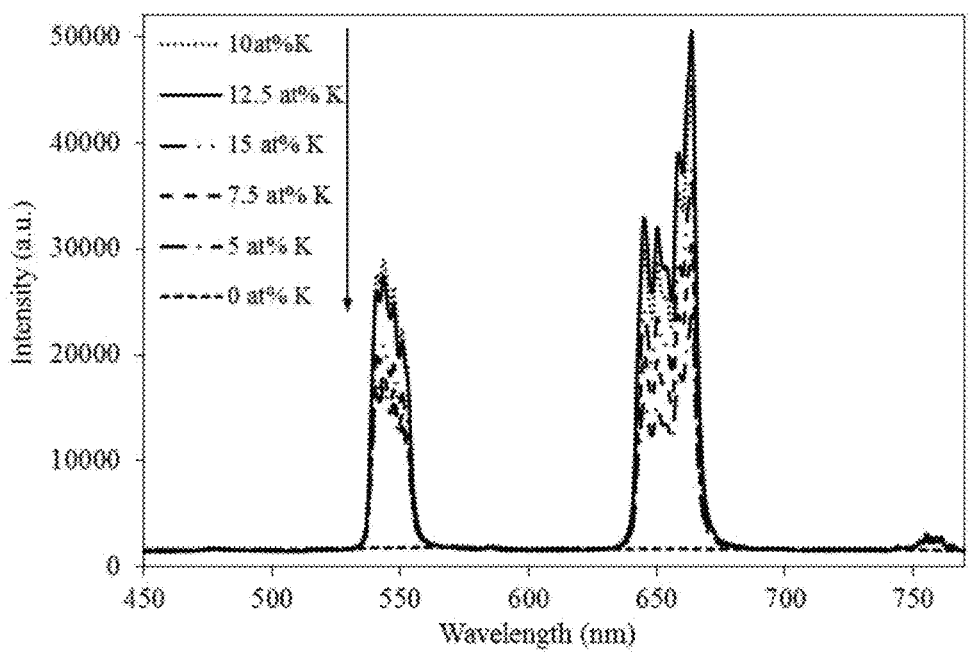
FIG. 18 is a graph showing the light emission spectra of the samples of Examples 41 and 55 to 58, and Comparative Example 7.

(4-4) Effects of the Content of the Monovalent Metal Ion on the Light-Emitting Properties FIG. 18 shows the measurement results of the light emission spectra of the samples of Examples 41 and 55 to 58, and Comparative Example 7.

From the results shown in FIG. 18, it has been able to verify that the content ratio of the monovalent metal ion affects the light-emitting properties, and it has also been able to verify that for the purpose of obtaining excellent light-emitting properties, the content ratio of the monovalent metal ion is preferably within a range from 5 to 15 at %.

Figure 19:
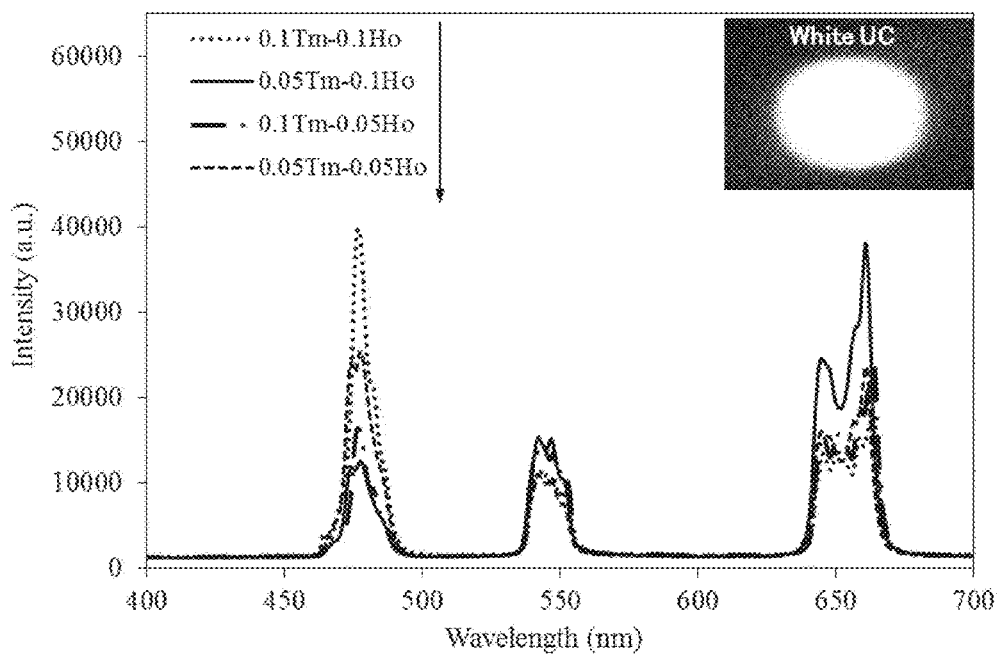
FIG. 19 is a graph showing the light emission spectra of the samples of Examples 59 to 62.
Figure 20:
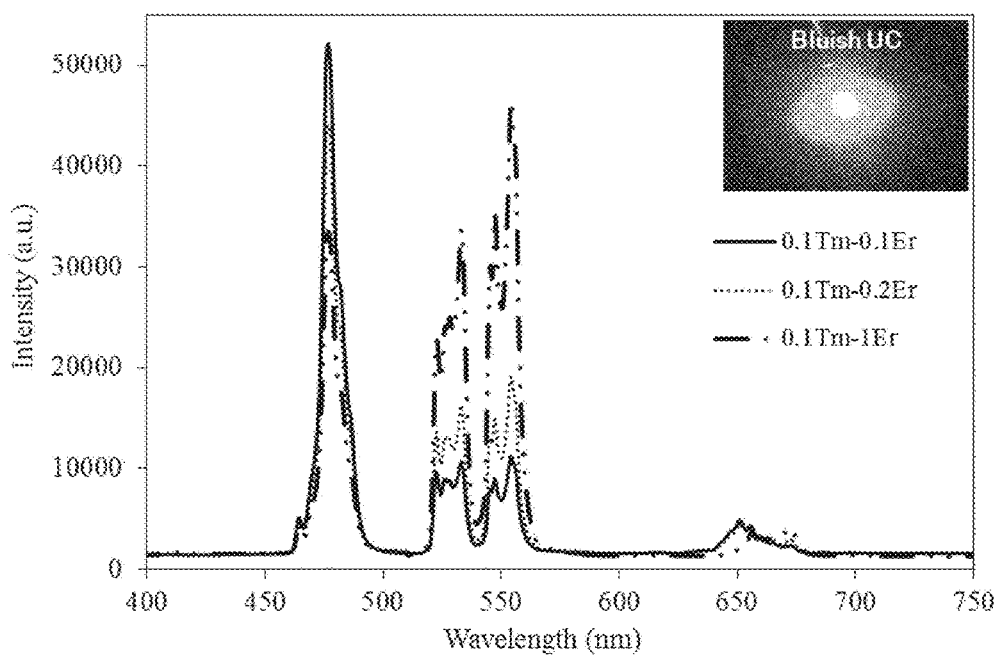
FIG. 20 is a graph showing the light emission spectra of the samples of Examples 63 to 65.
Figure 21:
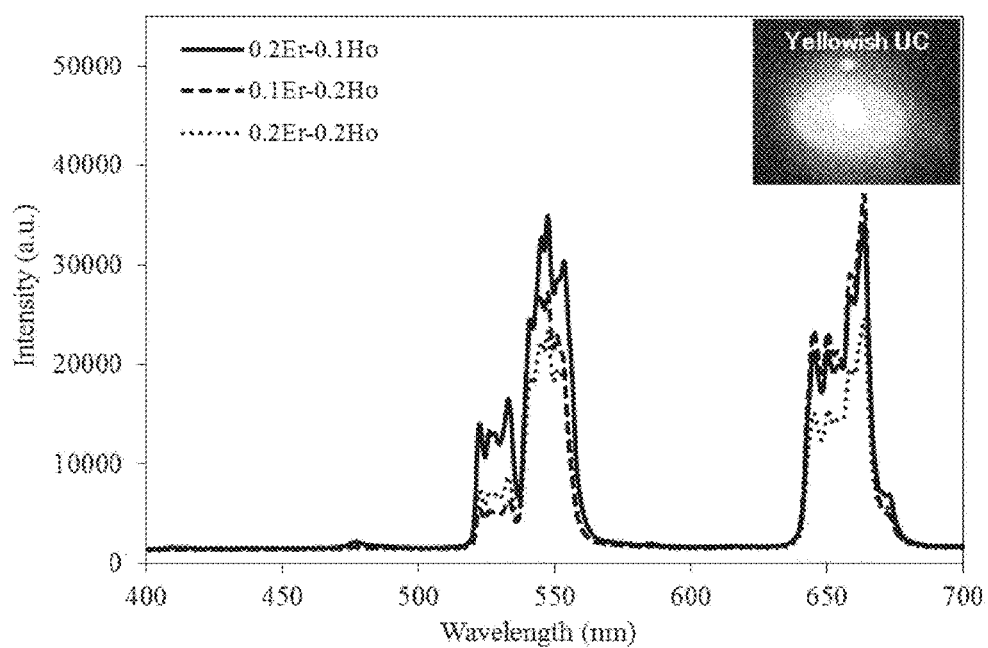
FIG. 21 is a graph showing the light emission spectra of the samples of Examples 66 to 68.
Figure 22:
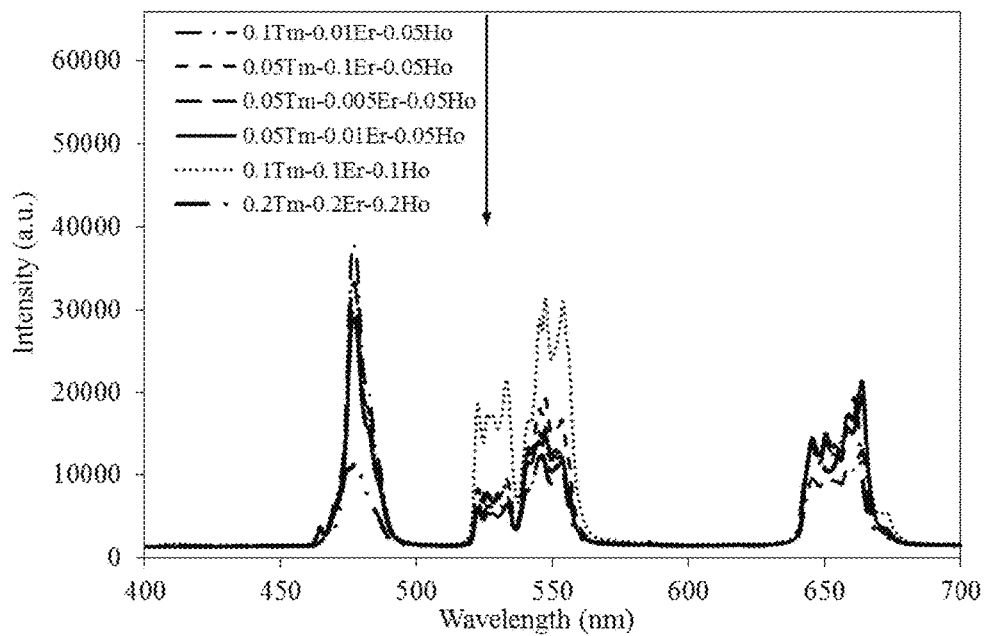
FIG. 22 is a graph showing the light emission spectra of the samples of Examples 69 to 74.

(5) Discussion on Up-Conversion Phosphor Allowed to Contain Combination of Two or More Rare Earth Metal Ions Specified in the Present Invention FIG. 19 shows the measurement results of the light emission spectra of the samples (using $Tm^{3+}$ and $Ho^{3+}$, in combination) of Examples 59 to 62; FIG. 20 shows the measurement results of the light emission spectra of the samples (using $Tm^{3+}$ and $Er^{3+}$, in combination) of Examples 63 to 65; FIG. 21 shows the measurement results of the light emission spectra of the samples (using $Er^{3+}$ and $Ho^{3+}$, in combination) of Examples 66 to 68; and FIG. 22 shows the measurement results of the light emission spectra of the samples (using $Tm^{3+}$, $Er^{3+}$ and $Ho^{3+}$, in combination) of Examples 69 to 74.

From the results shown in FIGS. 19 to 22, it has been able to verify that when two or more of the rare earth metal ions specified in the present invention are combined, according to the content proportions of the rare earth metal ions, the peak intensities are allowed to vary and the light-emitting color is allowed to be controlled.

(6) Others: Effects of Burning Temperature on Light-Emitting Properties

Figure 23:
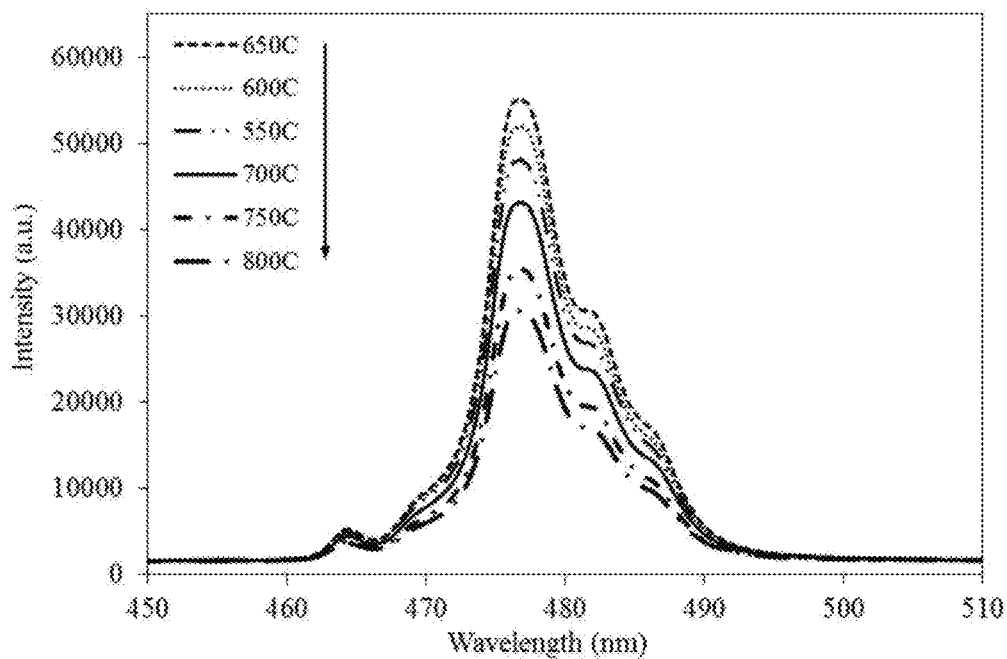
FIG. 23 is a graph showing the light emission spectra, in the wavelength region from 450 to 510 nm, of the samples of Examples 1 and 75 to 79.
Figure 24:
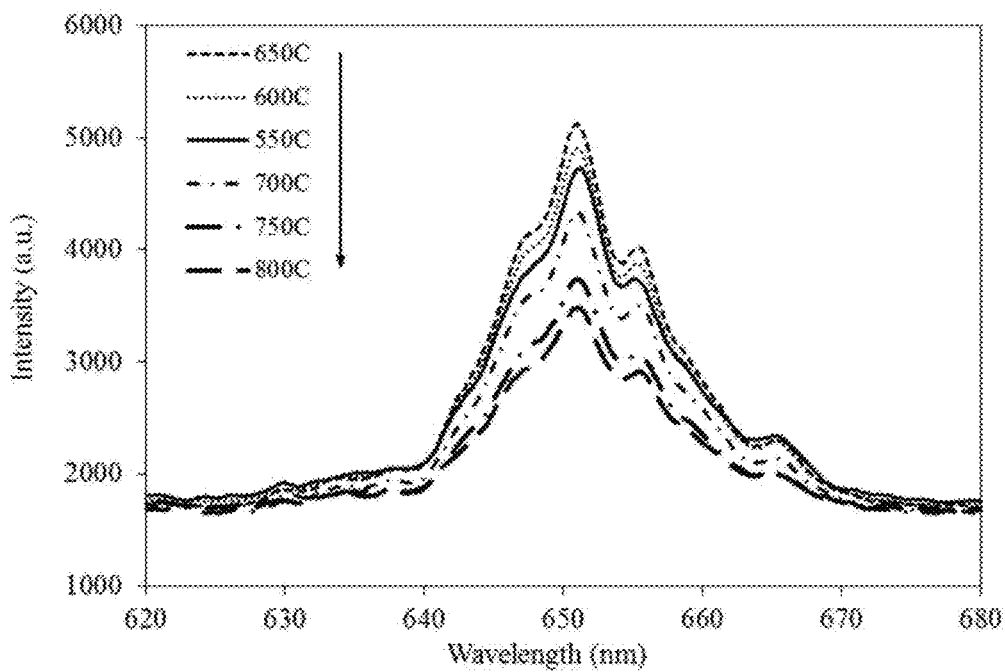
FIG. 24 is a graph showing the light emission spectra, in the wavelength region from 620 to 680 nm, of the samples of Examples 1 and 75 to 79.
Figure 25:
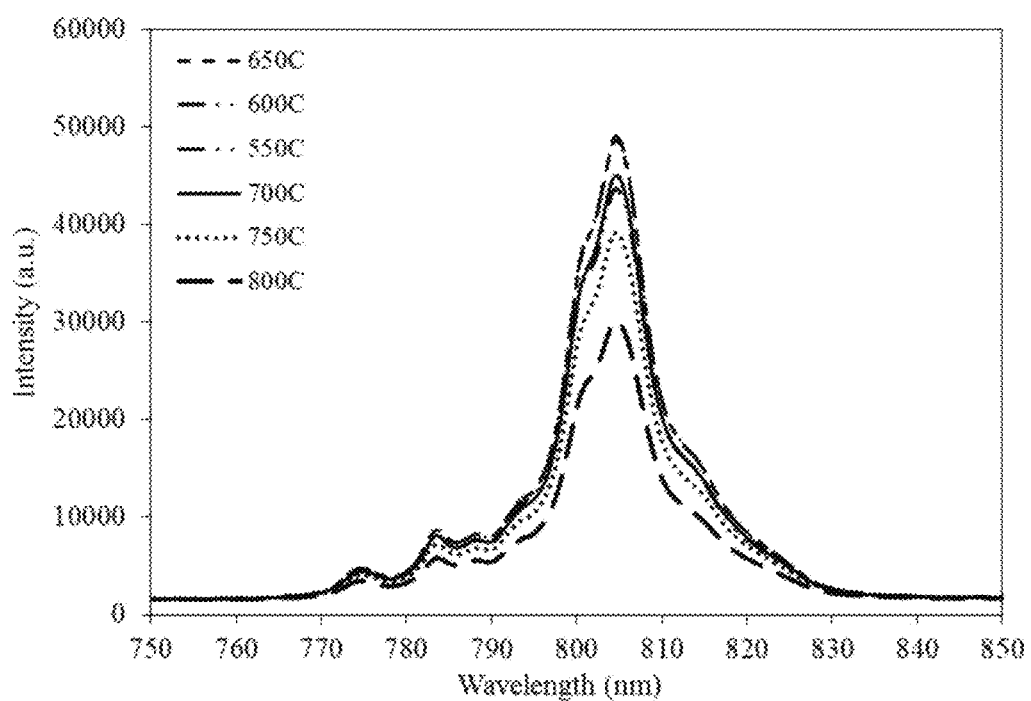
FIG. 25 is a graph showing the light emission spectra, in the wavelength region from 750 to 850 nm, of the samples of Examples 1 and 75 to 79.

FIGS. 23 to 25 show the measurement results of the light emission spectra of the samples of Examples 1 and 75 to 79.

From the results shown in FIGS. 23 to 25, it has been able to verify that the burning temperature affects the light-emitting properties to a certain degree, and it has also been able to verify that for the purpose of obtaining excellent light-emitting properties, the burning temperature is preferably within a range from 550 to 800° C., and in particular, within a range from 550 to 700° C.

INDUSTRIAL APPLICABILITY

The up-conversion phosphor of the present invention can be applied to the same applications as the applications of conventional phosphors, such as color displays, infrared sensors, optical recording data and laser materials. In particular, the up-conversion phosphor concerned allows the use of low-energy excitation light sources, and hence is suitable as a phosphor to substitute for conventional down-conversion phosphors and to be excellent in energy saving and stability.

The invention claimed is:

1. An up-conversion phosphor comprising, in a $ZnMoO_4$-based matrix material thereof, $Yb^{3+}$, at least one rare earth metal ion selected from the group consisting of $Tm^{3+}$, $Er^{3+}$ and $Ho^{3+}$, and at least one monovalent metal ion selected from the group consisting of $Li^+$, $K^+$, $Na^+$ and $Rb^+$.

2. The up-conversion phosphor according to claim 1, wherein when the total content of the divalent metal ion in the matrix material, $Yb^{3+}$, the rare earth metal ion and the monovalent metal ion is set at 100 at %, the content ratio of $Yb^{3+}$ is 20 at % or less.

3. The up-conversion phosphor according to claim 1, wherein the rare earth metal ion is $Tm^{3+}$, and when the total content of the divalent metal ion in the matrix material, $Yb^{3+}$, the rare earth metal ion and the monovalent metal ion is set at 100 at %, the content ratio of $Tm^{3+}$ is 2 at % or less.

4. The up-conversion phosphor according to claim 1, wherein the rare earth metal ion is $Er^{3+}$, and when the total content of the divalent metal ion in the matrix material, $Yb^{3+}$, the rare earth metal ion and the monovalent metal ion is set at 100 at %, the content ratio of $Er^{3+}$ is 5 at % or less.

5. The up-conversion phosphor according to claim 1, wherein the rare earth metal ion is $Ho^{3+}$, and when the total content of the divalent metal ion in the matrix material, $Yb^{3+}$, the rare earth metal ion and the monovalent metal ion is set at 100 at %, the content ratio of $Ho^{3+}$ is 5 at % or less.

6. The up-conversion phosphor according to claim 1, wherein when the total content of the divalent metal ion in the matrix material, $Yb^{3+}$, the rare earth metal ion and the monovalent metal ion is set at 100 at %, the content ratio of the monovalent metal ion is 20 at % or less.

* * * * *